United States Patent [19]

Asami et al.

[11] E Patent Number: Re. 33,601

[45] Reissued Date of Patent: Jun. 4, 1991

[54] REAR WHEEL SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Japan

[21] Appl. No.: 293,441

[22] Filed: Jan. 5, 1989

Related U.S. Patent Documents

Reissue of:

[64] Patent No.: 4,634,143
Issued: Jan. 6, 1987
Appl. No.: 813,506
Filed: Dec. 26, 1985

[30] Foreign Application Priority Data

Dec. 25, 1984 [JP] Japan ..... 59-276514

[51] Int. Cl.[5] ..... B60G 11/26

[52] U.S. Cl. ..... 280/707; 280/6.12; 280/DIG. 1; 180/41

[58] Field of Search ..... 280/707, 840, 6.1, 6.12, 280/DIG. 1

[56] References Cited

U.S. PATENT DOCUMENTS

| | | | |
|---|---|---|---|
| 2,978,254 | 0/1961 | Bundorf | 280/104 |
| 3,003,783 | 10/1961 | Brueder | 280/707 |
| 3,632,131 | 1/1972 | Engfer | 280/707 |
| 3,770,292 | 11/1973 | Palazzetti | 280/612 |
| 3,884,496 | 5/1975 | Ito et al. | 280/612 |
| 4,162,083 | 7/1979 | Zabler | 280/703 |
| 4,185,845 | 1/1980 | Misch et al. | 280/612 |
| 4,350,354 | 9/1982 | Dotti et al. | 280/612 |
| 4,364,574 | 12/1982 | Saito | 280/840 |
| 4,368,900 | 1/1983 | Beusse | 280/707 |
| 4,396,202 | 8/1983 | Kami et al. | 280/840 |
| 4,401,310 | 8/1983 | Ishikawa et al. | 280/6.1 |
| 4,402,375 | 9/1983 | Glaze | 180/169 |
| 4,433,849 | 2/1984 | Ohmori | 280/840 |
| 4,466,625 | 8/1984 | Kondo et al. | 280/707 |
| 4,513,833 | 4/1985 | Sheldon | 180/9.1 |
| 4,526,401 | 7/1985 | Kakezaki et al. | 280/707 |
| 4,540,188 | 9/1985 | Meloche et al. | 280/840 |
| 4,579,366 | 4/1986 | Doi et al. | 280/707 |
| 4,589,676 | 5/1986 | Meloche et al. | 280/707 |
| 4,593,920 | 6/1986 | Natsume et al. | 280/840 |
| 4,595,072 | 6/1986 | Barnea | 180/169 |
| 4,647,068 | 3/1987 | Asami et al. | 280/707 |
| 4,667,978 | 5/1987 | Asami et al. | 280/707 |
| 4,671,533 | 6/1987 | Asami et al. | 280/707 |
| 4,690,429 | 9/1987 | Asami et al. | 280/707 |
| 4,715,616 | 12/1987 | Asami et al. | 280/707 |
| 4,717,172 | 1/1988 | Asami et al. | 280/707 |
| 4,722,546 | 2/1988 | Asami et al. | 280/707 |
| 4,725,072 | 2/1988 | Asami et al. | 280/707 |
| 4,726,604 | 2/1988 | Asami et al. | 280/707 |

FOREIGN PATENT DOCUMENTS

| | | |
|---|---|---|
| 0091017 | 10/1983 | European Pat. Off. . |
| 0114757 | 8/1984 | European Pat. Off. . |
| 3002765 | 7/1981 | Fed. Rep. of Germany . |
| 3403649 | 8/1984 | Fed. Rep. of Germany . |
| 3407260 | 9/1984 | Fed. Rep. of Germany . |
| 2030690 | 11/1970 | France . |
| 2225303 | 4/1974 | France . |
| 2362017 | 3/1978 | France . |
| 2387133 | 11/1978 | France . |
| 57-172808 | 10/1982 | Japan . |
| 58-30542 | 2/1983 | Japan . |
| 58-149815 | 9/1983 | Japan . |
| 59-23712 | 2/1984 | Japan . |
| 59-23713 | 2/1984 | Japan . |
| 59-26638 | 2/1984 | Japan . |
| 59-63218 | 4/1984 | Japan . |
| 59-132408 | 7/1984 | Japan . |
| 59-129613 | 8/1984 | Japan . |
| 60-47711 | 3/1985 | Japan . |
| 2315020 | 8/1984 | United Kingdom . |

OTHER PUBLICATIONS

Mizuguchi, M. et al., Chassis Electronic Control Systems for the Mitsubishi 1984 Galant, SAE Technical Paper Series 840258, 1984.

European Search Reports for Application Nos. EP 86 10 1360 and EP 86 10 0420, (with abstract).

*Primary Examiner*—Kenneth R. Rice
*Attorney, Agent, or Firm*—Oliff & Berridge

[57] ABSTRACT

Present invention relates to an apparatus to improve the riding feel of the vehicle when the rear wheels pass over a sporadic hollows or protrusions of a ground by altering the rear suspension characteristic, i.e. the spring constant and the damping force of the shock absorbers after such hollows or protrusions are detected by front wheels of the vehicle passing thereover and the detected hollow or protrusion is judged to exceed a predetermined size. Besides that, the present invention has another control measures to give a priority to the maintenance of the vehicle posture when the driving condition is that need drivability and stability more than the riding comfort over the above-mentioned rear suspension characteristic alteration.

7 Claims, 20 Drawing Sheets

REAR WHEEL SUSPENSION CONTROLLER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a rear wheel suspension controller for a vehicle, particularly to a rear wheel suspension controller which is effective against a single shock caused by a protrusion or a hollow of a road surface on which an automobile is running.

2. Prior Art

Conventionally, the spring constant, damping force, bush characteristic or stabilizer characteristic of each of various suspension components provided between a body of a vehicle and its wheels is altered under control depending on conditions of a road surface or running conditions of the vehicle in order to prevent the vehicle from being shocked or vibrated and keep the controllability and the stability of the vehicle good.

For example, there are inventions to alter the spring constant of air spring for an air suspension in accordance with the state of road surface such as published unexamined patent application No. sho 59-26638, those to alter the damping force of a shock absorber as well as the spring constant of an air spring such as published unexamined patent application No. sho 59-23712, those to alter the damping force of a shock absorber only such as published unexamined patent application No. sho 58-30542, those to alter the vehicle height such as published unexamined patent application Nos. sho 57-172808 and 59-23713, those to alter just the rigidity of a bush such as published unexamined utility model application No. sho 59-132408 and those to alter the rigidity of a stabilizer such as published unexamined utility model application Nos. sho 59-129613 and 59-135213.

The above-mentioned controllers detect the running state on the rough road by vehicle height sensor, alter a characteristic of each suspension, maintain the controllability and the stability during rough road running and prevent dive, squat, rolling, etc. in case of predicting the sudden change of vehicle posture, e.g., dive, squat, rolling, etc. by brake lamp switch, throttle position sensor and steering sensor.

However, such conventional controllers judge the running state as bad only after severe changes are detected continuously by vehicle height sensors or vehicle height acceleration sensors in a predetermined interval and alter the suspension characteristics of all the wheels so as to achieve a predetermined effect. In such cases, they do not alter the characteristics of suspensions when passing over such kind of shock like a joint of road patches, a single protrusion or hollow of a road surface, because they resume running on a flat road after receiving a single shock.

Accordingly, in case of a single protrusion or hollow of a road surface, there is a difficulty in preventing an uncomfortable shock, vibration and noise for passengers and the controllability and the stability of the vehicle are deteriorated.

Further, even if they can alter the characteristic of the suspension after the judgment of a single protrusion or hollow, there is still such a problem that the controllability and stability are deteriorated when the charge in the vehicle posture becomes severe during sudden turning, braking, accelerating, etc. of the running vehicle.

SUMMARY OF THE INVENTION

It is the first object of the present invention to offer a good ride comfort to passengers when a vehicle passes over a single protrusion or hollow of a road surface.

The second object of the present invention is to carry out such a control of suspensions regarding the controllability and stability as minimizing the charge of a vehicle posture in case of sudden turning, braking, accelerating, etc. as well as achieving the first object.

It is the third object of the present invention to make it possible to set different characteristics of suspensions for the front and the rear wheels so as to increase a flexibility in designing of vehicle suspension characteristics.

To achieve the above objects, the present invention proposes a novel rear wheel suspension controller comprising:

*a rear wheel suspension control portion including:*

[a] front wheel vehicle height detection means for detecting an interval between a front wheel and a vehicle body and for generating a vehicle height signal indicative of the interval;

[a] first judgment means for comparing said vehicle height signal with a predetermined reference signal and for generating a first judgment signal when the vehicle height signal is greater than the reference signal; *and*

[a] rear wheel suspension characteristic alteration means for altering *a* suspension characteristic of a rear wheel in accordance with said first judgment signal;

*a vehicle posture control portion including:*

[a] driving state detection means for detecting a driving state of the vehicle and for generating *at least* one [or plural] state [signals] *signal* indicative of the driving state;

[a] second judgment means for comparing said *at least one* state [signals] *signal* with respectively corresponding predetermined [condition] *conditions* and for generating *a* second judgment signal when said *at least one* state [signals satisfy] *signal satisfies* the *respective* predetermined conditions;

[a] suspension characteristic alteration means for controlling the suspension characteristic in accordance with said second judgment signal; and

[a] preference means for preferring the control of [a] *said* vehicle posture control portion [which is consisted of the front wheel vehicle height detection means, the first judgment means and the rear wheel suspension characteristic alteration means] to that of [a] *said* rear wheel suspension control portion [which is consisted of the driving state detection means, the second judgment means and the suspension characteristic alteration means].

It is possible to constitute the front wheel vehicle height detection means by utilizing a potentiometer which converts a movement of suspension arm into a change in an electric resistance or by utilizing a photointerrupter which converts a suspension arm movement into a significant spell of pulses with a use of a light emitter and a slitted plate. The signals indicative of the front wheel vehicle height may include data corresponding not only to the displacement of the front wheel but also to the speed or the acceleration of the displacement, an amplitude of the vehicle height vibration, etc. Such data can be obtained by carrying out a calculation of the first derivative the second derivative of the displacement data with regard to time for the speed and the acceleration and a calculation of the difference between the maximum and the minimum values of the displacement data.

The first judgment means judges whether or not the front wheels pass over a protrusion or hollow of a predetermined size and informs the rear wheel suspension characteristic alteration means of passing of the front wheel over them.

It will be noted a microcomputer compares input digital signal with a reference signal stored in a read only memory (ROM).

The characteristic of each suspension here is referred to as the spring constant, the vehicle body height, damping force of shock absorbers, bush property and stabilizer property of the suspension, in the main. Rear suspension characteristic alteration means changes such characteristic of each suspension.

The rear wheel suspension control portion includes the front wheel vehicle height detection means, the first judgment means and the rear wheel suspension characteristic alteration means.

The driving state detection means is constructed mainly by, for example, a steering angle sensor, a brake lamp switch, a throttle position sensor, a neutral start switch, a vehicle speed sensor, etc.

These sensors and switches detect causes of vehicle posture change beforehand. It is a design choice whether a single or a plurality of the sensors or switches are adopted for predicting the vehicle posture change.

The second judgment means judges whether the vehicle posture change satisfies a preset condition, for example, the steering angle is greater than a preset value or the driver stamps the brake pedal. If the condition is satisfied, the second judgment means outputs a second judgment signal to the suspension characteristic alteration means.

The apparatus by the invention serves for securing the controllability and stability of the vehicle by altering the suspension characteristic. And when a change in the vehicle posture is anticipated by driving state sensors, the altering of the suspension characteristic is stopped in order not to disturb the vehicle posture during the dynamic movement of the vehicle. In this apparatus, the suspension characteristic alteration means may alter, in response to the second judgment signal, the rear wheels only, the front wheels only or both front and rear wheels depending on the designers intention.

The driving state detection means, the second judgment means, the suspension characteristic alteration means, all of which mentioned above systematically constitutes the vehicle posture control means.

The preference means is a means for performing the control which gives the priority to the vehicle posture control portion, when the contradiction occurs between the controls from the suspension control portion and that from the vehicle posture portion for altering or unaltering the suspension characteristic. It is advantageous to adopt such a control that serves to restore the suspension characteristic to the original state after a predetermined time interval commensurate with the vehicle speed is elapsed from the time point when the rear suspension characteristic is altered in response to the above-mentioned first judgment signal. Accordingly, one of the advantages of the present invention is that the suspension characteristic is returned to the original state suitable for the normal road condition.

Furthermore, it is advantageous to adopt a control which detects the distances between the right front wheel and the vehicle body and the left front wheel and the vehicle body respectively and generates a vehicle height signal corresponding to the average value of the both distances, or generates a signal corresponding to the higher value of the two distances.

Moreover, it is advantageously to adopt such a control that the first judgment means compares the front vehicle height signal with a plural number of predetermined signals and generates a plural kinds of the first judgment signals commensurate with the size of the detected protrusion or hollow. The rear suspension characteristic means alters the rear suspension characteristic into a plural of stages according to the plural first judgment signals. This alteration to the plural stages of the rear wheel suspension characteristic is for coping with various hollows and protrusions of the road surface varied in degree, so realizing a good coexistence of the improvements in the riding comfort and the security of controllability and stability.

Adopting the selection circuit for stopping generation of the first judgement signal regardless of the value of the front vehicle height signal is prepared for the drivers option whether he wants to have the above-mentioned suspension control or not.

BRIEF DESCRIPTION OF THE DRAWINGS

A more complete appreciation of the invention and many of the attendant advantages thereof will be readily obtained as the same becomes better understood by references to the following detailed description when considered in connection with the accompanying drawings wherein;

[FIGS. 13A, 13B and 13C respectively show]

FIGS. 16A, 16B, 16C, 16D, 16E, 16F and 16G show a construction of a variable-stiffness stabilizer.

DESCRIPTION OF THE PREFERRED EMBODIMENTS

Figure 1:
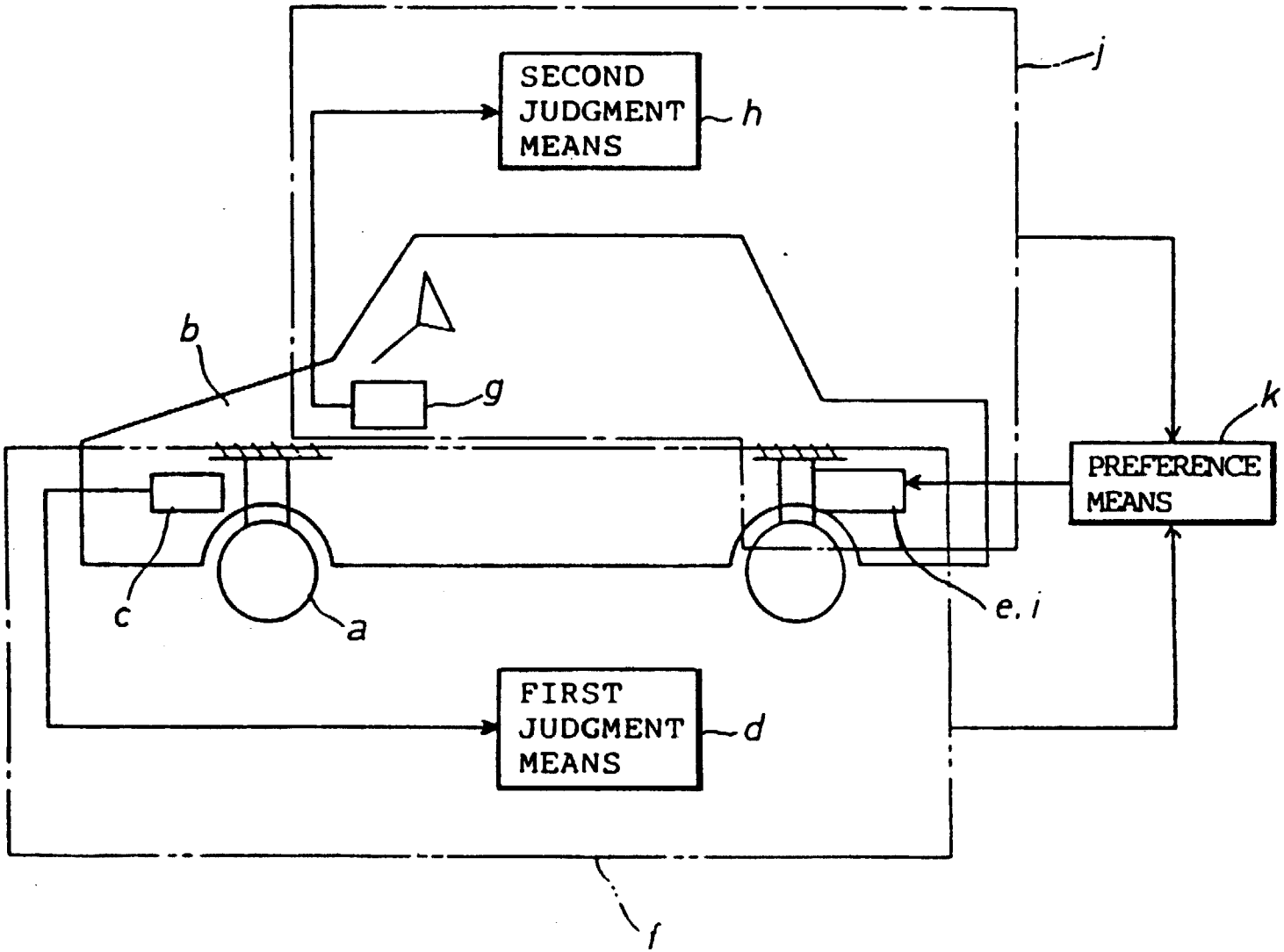
FIG. 1 shows an outline of a constitution of the first embodiment of the present invention.

One embodiment of the present invention is explained in detail. FIG. 1 is a general construction of this embodiment showing a relationship between the means. A vehicle height signal is transmitted from the front vehicle height detection means c for detecting the interval between the front wheels a and the vehicle body b to the first judgment means d. The first judgment means d transmits the first judgment signal to the rear wheel suspension characteristic alteration means e via preference means k, in case it is detected that a vehicle height signal is larger than a predetermined value. The front height detection means c, the first judgment means d, the preference means k and the rear suspension alteration means, all of which systematically constitute a rear suspension control portion f.

A driving condition signal is transmitted from the driving state detection means g to the second judgment means h. A second judgment signal is transmitted from the second judgment means h to a suspension characteristic alteration means i via the preference means k. All means as mentioned in this paragraph systematically constitute a vehicle height control portion.

Figure 2:
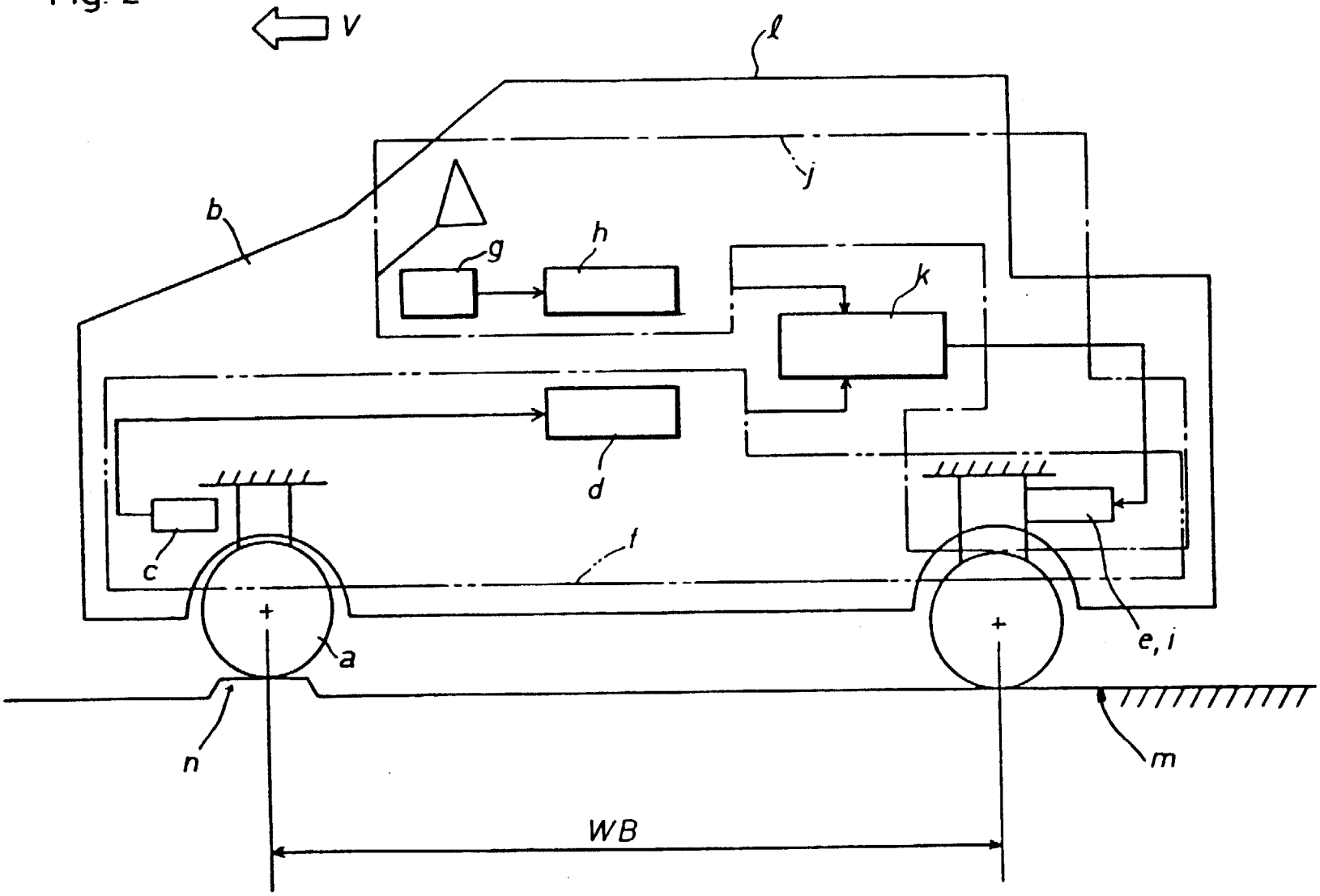
FIG. 2 shows diagrammatically of the action of the constitutions of the embodiment.

The operation of this embodiment is described in detail as follows with FIG. 2. FIG. 2 shows a situation that a vehicle rides on a single protrusion n of the road surface m when running at a speed V. In this condition, change in vehicle height is detected by front vehicle height detection means and a vehicle height signal is outputted to the first judgment means d. In this case, the first judgment means d judges that the vehicle height signal is out of a predetermined range, then the rear suspension control portion f outputs a signal to the preference means k. On the other hand, the driving condition detecting means g detects a signal from a driving system (e.g. brake lamp switch is ON) and a signal is outputted from the second judgment means h, then it is judged a nose-dive will occur by dint of the braking, and a vehicle height control portion outputs a signal to the preference means k to control the vehicle posture.

The preference means k, when it receives a signal outputted from a rear wheel suspension control portion f and a signal outputted from the vehicle height detecting portion simultaneously, gives a priority to the signal outputted from vehicle height control portion j over the signal outputted from the rear wheel suspension control portion and performs an anti-dive control against the braking by altering, for example, the rear suspension characteristic by sending a signal to the suspension alteration means i.

If it is judged a signal detected by the driving state detection means g does not satisfy the predetermined condition, rear suspension characteristic alteration means e is driven by the preference means k in response to a signal outputed from the rear suspension control portion, as the vehicle height control portion j, and then the rear wheel suspension characteristic is changed to 'soft'.

As this change control is terminated within a time interval from a time point when the front wheels begins to ride on the protrusion n of the road surface until a time point when the rear wheels pass over it, the rear wheels pass over the protrusion with the suspension characteristic of 'soft' state. If in case the vehicle requires vehicle posture control, the control is given a first privilege, and in other cases the rear suspension characteristic alteration control is performed.

Figure 3:
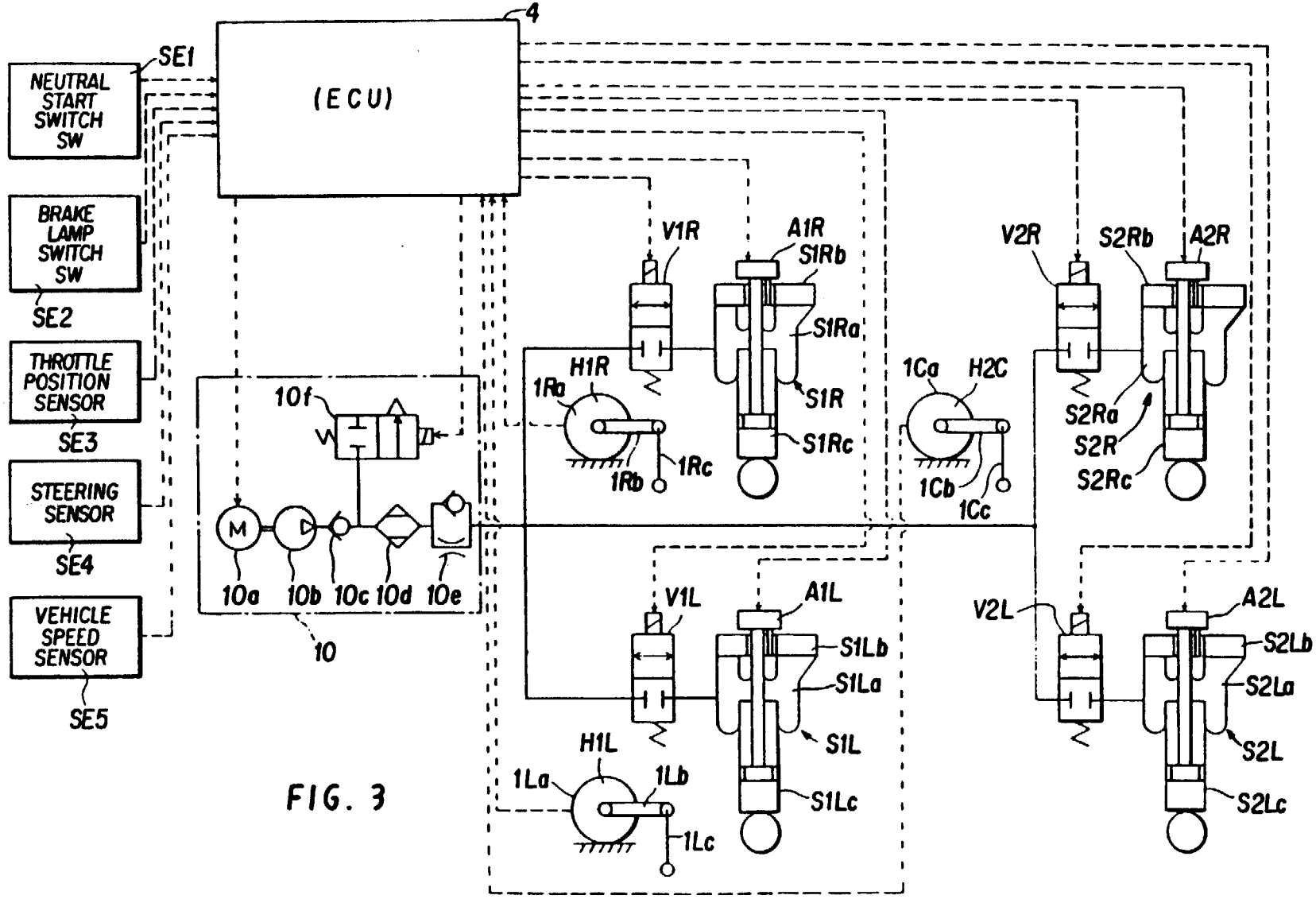
FIG. 3 shows details of the system of the first embodiment.

FIG. 3 shows a construction of the present embodiment more concretely, in which suspension control devices for a vehicle using air suspension system is explained as follows in view of the systematical relationship between the peripheral units.

A right front wheel vehicle height sensor H1R is provided between the body and right front wheel of the automobile to detect the distance between the automobile body and a right suspension arm, which follows the motion of the wheel. A left front wheel vehicle height sensor H1L is provided between the body and the left front wheel of the vehicle to detect the distance between the vehicle body and a left suspension arm. The short cylindrical bodies 1Ra and 1La of the vehicle height sensors H1R and H1L are secured on the vehicle body. Links 1Rb and 1Lb extend from the center shafts of the bodies 1Ra and 1La almost perpendicularly to the center shafts.

Turnbuckles 1Rc an 1Lc are rotatably coupled to the ends of the links 1Rb and 1Lb opposite the bodies 1Ra and 1La. The ends the turnbuckles 1Rc and 1Lc opposite the links are rotatably coupled to portions of the suspension arms. A potentiometer, whose electric resistance changes depending on the rotation of the center shaft of the body of each vehicle height sensor to take out the charge in the vehicle height in the form of a voltage change, is built in each of the bodies of the vehicle height sensors H1R and H1L. Although the vehicle height sensors of the above-mentioned type are used in this embodiment, vehicle height sensors of such other type may be used that plural light interrupters are provided in the body of each sensor, and a disk having slits coaxial with the center shaft of the sensor turns on or off the light depending on the change in the vehicle height.

Numerals S2R, S2L, S1R and S1L respectively show air suspensions. The air suspension S2L is provided substantially between the air suspension arm and the vehicle body. The above-mentioned air suspension S2L is composed of a main air chamber S2La functioning as an air spring, an auxiliary chamber S2Lb, a shock absorber S2Lc, and an actuator A for altering the spring constant and the damping force of the shock absorber.

The air suspensions designated by the numerals S1L, S1R and S2R have the same components of the air suspension mentioned above and function as same as above, and S1L, S1R, and S2R are provided to the left front wheel, the right front wheel and the right rear wheel, respectively.

Numeral 10 is compressed air feed system for the suspensions S1L, S1R, S2L and S2R comprising a motor 10a to drive a compressor to generate compressed air. The compressed air is led to an air drier via a check valve 10c. The air drier 10d functions to dry compressed air supplied to the air suspensions S1L, S1R, S2L, and S2R and in order to protect every part of each air suspension S1L, S1R, S2L, and S2R from moisture of the compressed air and in order to prevent abnormal pressure change accompanied by a phase change in each main air chamber S1La, S1Ra, S2Lb, and S2R. Ordinarily fixed restriction 10e belonging to the check valve 10c moves from the compressor side to the side of each air suspensions S1L, S1R, S2L, and S2R. The check valve having fixed restriction itself open its checking portion at the time inhaling the compressed air, on the contrary at the time exhaling the compressed air, the checking portion thereof is closed and compressed air is exhaled only by the checking portion. Exhaling valve 10f is an electromagnetic valve of 2-port 2-position spring off-set type. Normally, the exhaling valve is interrupted its communication, but in case of exhaling the compressed air from the air suspension S1L, S1R, S2L, and S2R, the exhaling valve is switch to change the condition into communication and exhaling the compressed air to the atmosphere. Numerals V1L, V1R, V2L, and V2R are inhale and exhale valve of the air all of which having functions to adjust the vehicle height, and substantially disposed between the air suspensions S1L, S1R, S2L and S2R, and the above-mentioned compressed air inhale and exhale valve system. The air spring inhale and exhale valves V1L, V1R, V2L, and V2R are 2-port and 2-position electromagnetic valves of spring off-set type, and normally they are preventing their communication, but in case of adjusting the vehicle height, they are switched to change into communication condition. In specific, if the air spring inhale and exhale valves V1L, V1R, V2L, and V2R are to be communicated, it is made possible to exhale and inhale compressed air between the main air chambers S1La, S1Ra, S2La, and S2Ra. If the air is inhaled, the volumes in the main air chambers S1La, S1Ra, S2La, and S2Ra are increased to raise the vehicle height, and if the air is exhaled due to the vehicle weight itself, the volumes thereof are decreased. In addition, if the inhale and exhale valves V1L, V1R, V2L, and V2R are made in the interrupted condition, the vehicle height is kept to the vehicle height that is determined when the interruption is occurred. As can be seen from the above description, to control the communication and discommunication between the above-mentioned exhaling valve 10f belonging to compressed air inhale and exhale air supplying system and each of above-mentioned inhale and exhale valve V1L, V1R, V2L, and V2R make it possible to adjust the vehicle height to alter the respective main air chambers of the air suspensions S1L, S1R, S2L, and S2R.

Numeral SE1 denotes a neutral start switch provided with an automatic transmission of the vehicle, and outputs signals corresponding to a shift positions of P and N of the automatic transmission, SE2 denotes a brake lamp switch for outputing a braking signal in response to the braking operation of the driver. SE3 denotes a throttle position sensor for outputing a signal corresponding to the treadled degree of the accelerator pedal. [SE2] *SE4* denotes a steering provided normally below a steering column for detecting the turning direction and torque of the steering wheel and for outputting a corresponding signal. SE5 denotes a vehicle speed sensor installed in a speedometer.

Each signal outputed from the vehicle height sensors H1L, H1R, the neutral start switch SE1, the brake lamp switch SE2, the throttle position sensor SE3, the steering sensor SE4, the vehicle height sensor SE5 is inputted to an ECU 4. This ECU is inputed the signal as mentioned above to perform a data processing.

The ECU outputs driving signal to the air suspension actuators A1L, A1R, A2L, and A2R, to air spring inhale and exhale valve V1L, V1R, V2L, and V2R, and the motor 10a belonging to the compressed air inhale and exhale system so as to perform the proper control according to requirement.

Below is a description explaining the constitution of the main portions which constitute the air suspensions S1L, S1R, S2L, and S2R.

Figure 4:
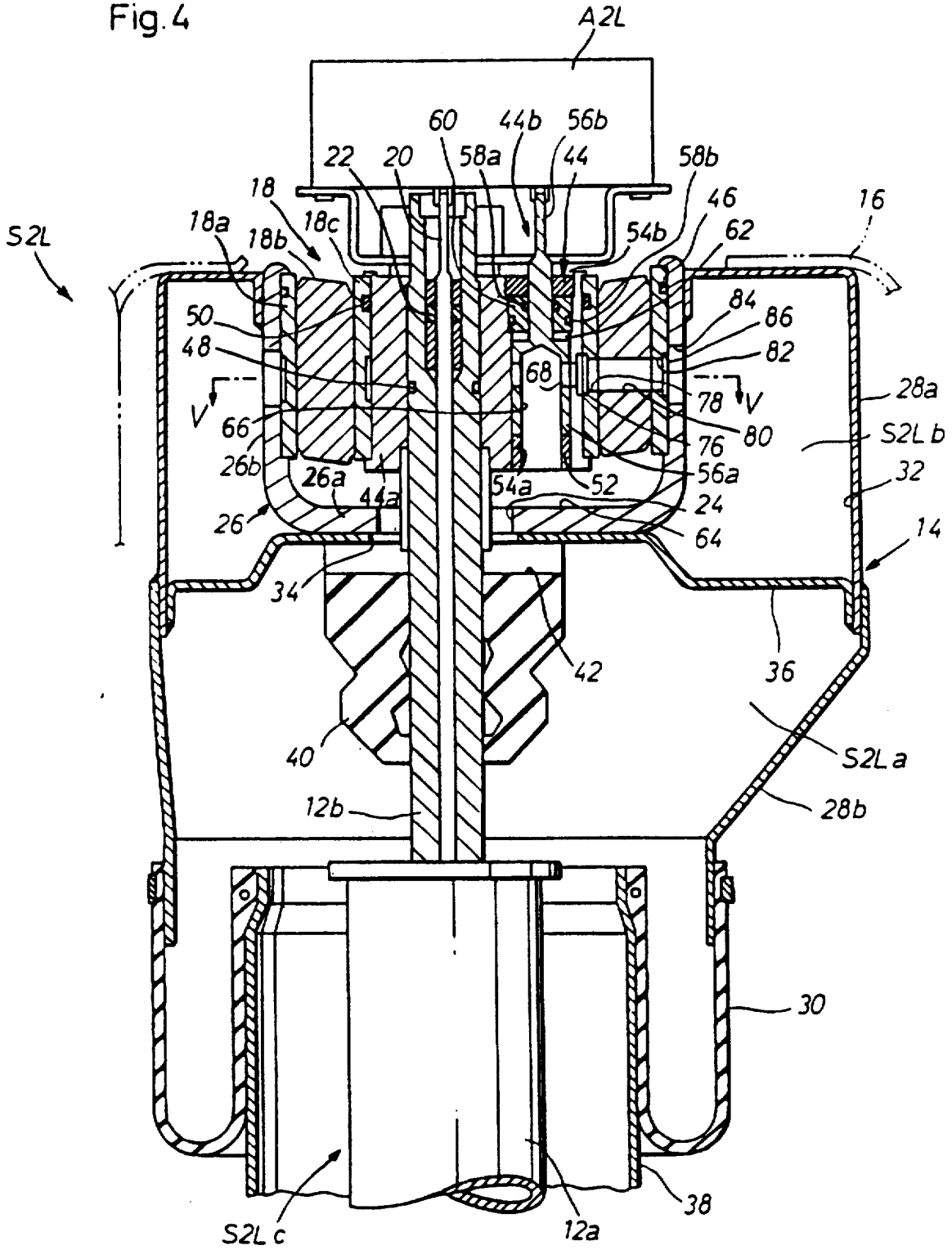
FIG. 4 shows a sectional view of a main part of an air suspension.
Figure 5:
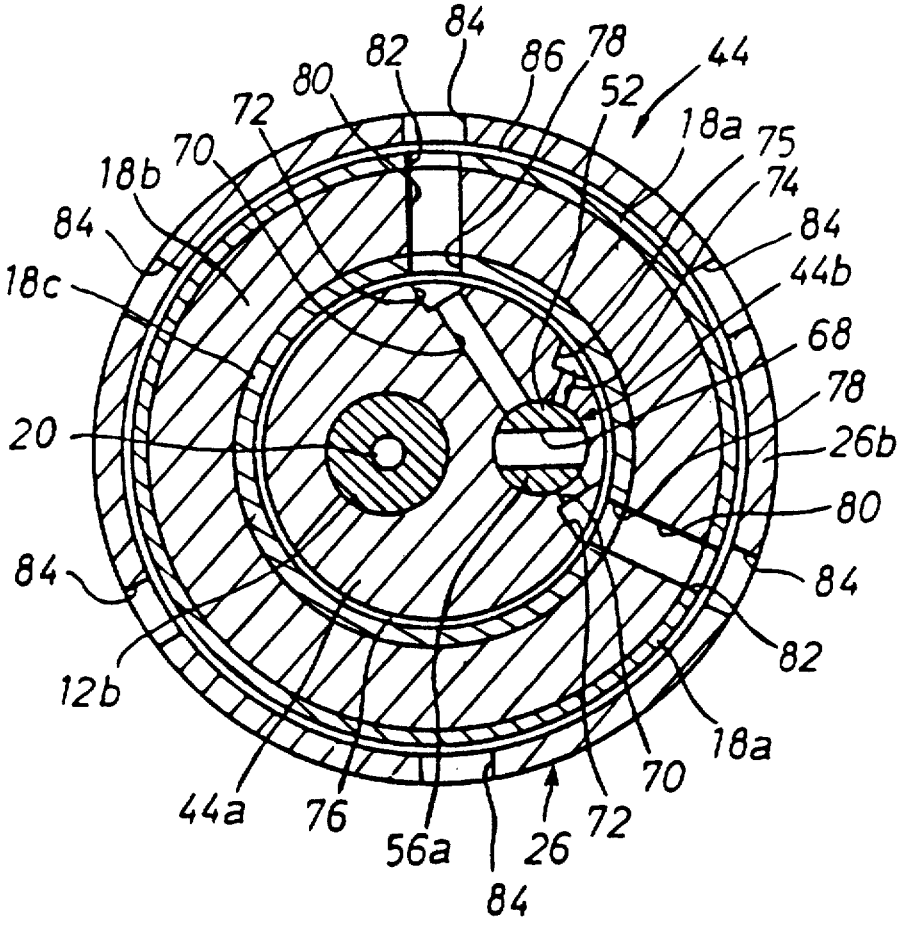
FIG. 5 shows a sectional view along a line V—V shown in FIG. 4.

FIGS. 4 and 5 show a construction of the main part of the air suspension S2L. FIG. 5 shows a sectional view along a line V—V shown in FIG. 4. The other air suspensions S2L, S1R, and S1L have the same construction as the suspension S2L. The air suspension S2L includes a conventional shock absorber S2Lc composed of a piston and a cylindrical, and an air spring unit 14 provided in conjunction with the shock absorber. An axle (not shown) is supported at the lower end of the cylinder 12a of the shock absorber S2Lc. An elastic cylindrical assembly 18 for elastically supporting a piston rod 12b to the vehicle body 16 is provided at the upper end of the piston body 12b extending from the piston (not shown) slidably fitted in the cylinder 12a. The shock absorber S2Lc is a conventional buffer whose damping force can be varied for adjustment by driving the valve function of the piston. A control rod 20 for adjusting the damping force is liquid-tightly and rotatably fitted with a sealing member 22 in the piston rod 12b.

The air spring unit 14 has a chamber 32 which is defined by a circumferential member 26 comprising a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28a open at the lower end and coupled to the lower end of the upper housing member 28a, and a diaphragm 30 made of an elastic material and closing the lower end of the lower housing member 28b. The chamber 32 is divided into a lower main air chamber S2La and an upper auxiliary air chamber S2Lb by a partition member 36 secured on the bottom 26a of the circumferential member 26 and having an opening 34 corresponding to the opening 24 provided in the bottom 26a. Both the chambers S2La and S2Lb are filled with compressed air. The partition member 36 is fitted with a conventional buffer rubber 40 which can be brought into contact with upper end of the cylinder 12a. The buffer rubber 40 has a passage 42 for connecting the openings 24 and 34 to the main air chamber S2La.

The elastic cylindrical assembly 18 is disposed inside the circumferential member 26 whose wall 26b defines the inside circumferential surface of the auxiliary air chamber S2Lb, in such manner that the assembly 18 surrounds the piston rod 12b. The cylindrical elastic assembly 18 is provided with a valve unit 44 for controlling the communication of both the air chambers S2La and S2Lb. The assembly 18 includes an outer cylinder 18a, a cylindrical elastic member 18b and an inner cylinder 18c which are disposed concentrically to each other. The cylindrical elastic member 18b is secured on both the cylinders 18a and 18b. The outer cylinder 18a of the assembly 18 is pressfitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and the valve casing 44a.

The valve casing 44a has a hole 52 which is open at both the ends and extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber S2La through the openings 24 and 34 and the passage 42 of the buffer rubber 40, is formed in the lower portion of the elastic cylindrical assembly 18. The main portion 56a of the valve 44b has a recess 66 open to the chamber 64, and has a communication passage 68 extending through the main portion 56a in a diametrical direction thereof across the recess 66.

The valve casing 44a, which houses the valve 44b, has a pair of air passages 70, each of which can communicate at one end with the communication passage 68, as shown in FIG. 5. The air passages 70 extend on almost the same plane outwards in a diametrical direction of the hole 52, toward the peripheral surface of the valve 44b. The other end of each air passage 70 is open to the peripheral surface of the valve casing 44a through a face hole 72. An air passage 74, which can communicate at one end with the communication passage 68, extends on almost the same place as the pair of air passages 70 toward the peripheral surface of the valve casing 44a, between the pair of air passages 70 outside the hole 52. The diameter of the air passages 74 is smaller than that of each of the air passages 70. The other end of the air passages 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b correspondingly to the openings 78. The through holes 80 are made open to the peripheral surface of the outer cylinder 18a through the openings 82 of the cylinder so that the openings 78 and 82 and the through holes 80 define an air passage including the air passages 70 and extending through the elastic cylinder assembly 18.

The peripheral surface of the wall 26b of the circumferential member 26 covering the outer cylinder 18a are provided with plural openings 84 which are located at equal intervals in the circumferential direction of the member 26 and extend continuously to the auxiliary air chamber S2Lb to connect the openings 78 and 82 and the through holes 80 to the auxiliary air chamber S2Lb. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 5, the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber S2Lc, and a conventional actuator A2L for rotating the valve 44b of the valve unit 44, are provided at the upper end of the piston rod 12b, as shown in FIG. 4.

Since the air suspension S2L has the above-mentioned construction, the air suspension performs actions described hereinafter. When the valve 44b is kept in such a closed position shown in FIG. 5 that the communication passage 68 of the valve does not communicate with any of the air passages 70 and 74 of the valve casing 44a, the main air chamber S2La and the auxiliary air chamber S2Lb are disconnected from each other so that the spring constant of the suspension 3 is set at a large value. When the actuator A2L has rotated the valve 44b into such a position that the communication passage 68 of the valve communicates with the large-diameter air passages 70 of the valve casing 44a, the main air chamber S2La is connected to the auxiliary air chamber S2Lb through the communication passage 68 communicating with the main air chamber, the large-diameter air passages 70 and the openings 78 and through holes 80 of the elastic assembly 18 and the openings 82 and 84, so that the spring constant of the suspension S2L is set at a small value. When the value 44b is rotated into such a position by the regulated actuator A2L that the communication passage 68 of the valve communicates with the small-diameter communication passage 74 of the valve casing 44a, the main air chamber S2La is connected to the auxiliary air chamber S2Lb through the communication passage 68 communicating with the main air chamber, the small-diameter air passage 74, the air passage 76, the openings 78 and through holes 80 of the elastic assembly 18 and the openings 82 and 84, so that the spring constant of the suspension [3] *S2L* is set at an intermediate value because the small-diameter air passage 74 provides a higher air flow resistance than the large-diameter air passages 70.

Figure 6:
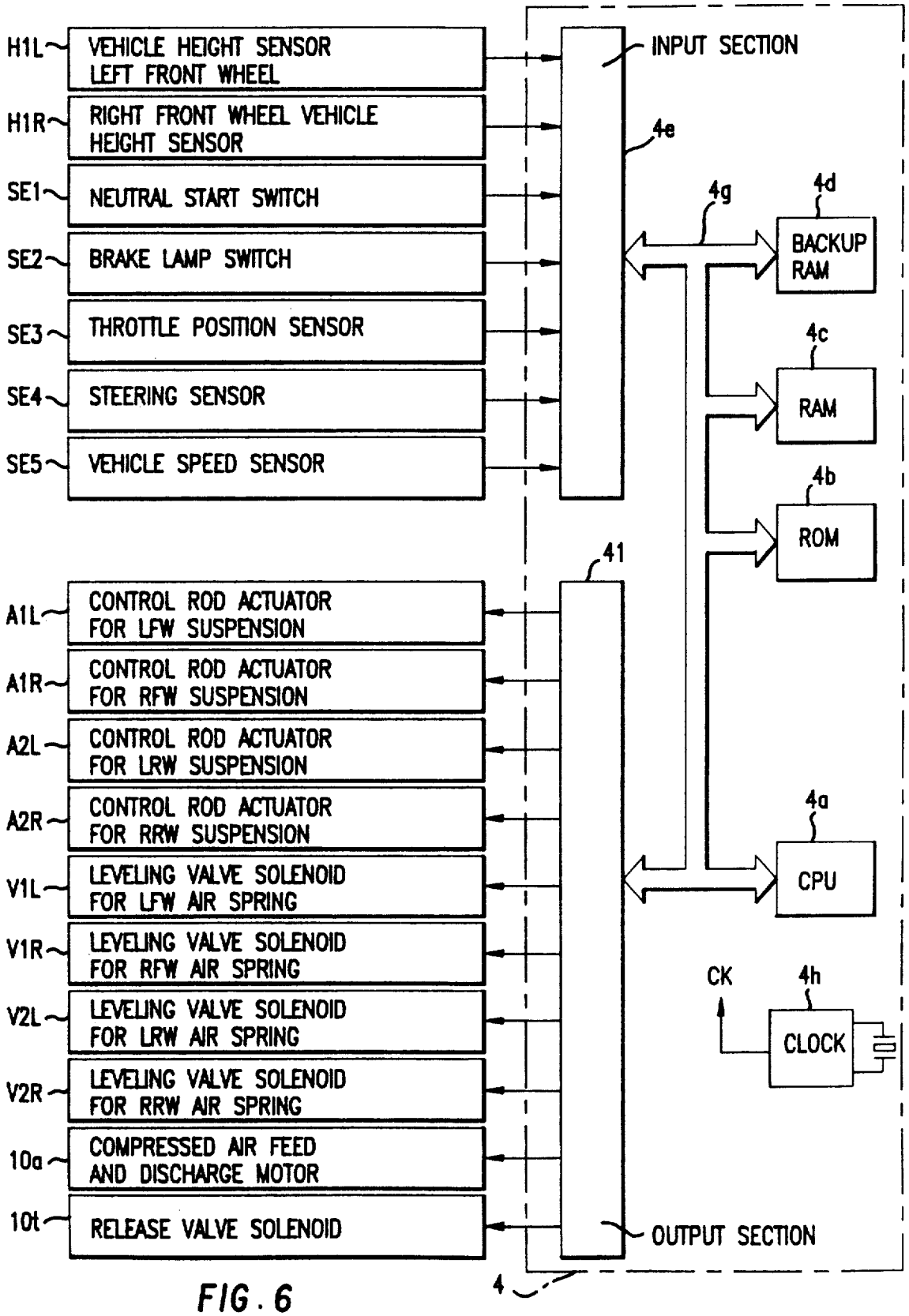
FIG. 6 shows a block diagram of an electronic control unit (ECU).

FIG. 6 shows the construction of the ECU 4. A central processing unit (CPU) 4a receives the output data from the sensors and performs operations on the data, in accordance with a control program, to carry out processings for the control of various units or means or the like. The control program and initial data are stored in a read only memory (ROM) 4b. The data, which are entered in the ECU 4, and data necessary for operations and control, are stored into and read out of a random access memory (RAM) 4c. A backup random access memory (backup RAM) 4d is backed up by a battery so that even if the ignition key switch of the automobile is turned off, the backup RAM retains data which are needed after the turning-off of the switch. An input section 4e includes an input port (not shown) a wave-shaping circuit, if necessary, a multiplexer which selectively sends out the output signals of the sensors to the CPU 4a, and an A/D converter which changes an analog signal into a digital signal. An output section 4f includes an output port (not shown) and a driving circuit for the actuators according to the control signals of the CPU 4a as occasion demands. A bus 4g connects circuit components such as the CPU 4a and the ROM 4b, the input section 4e and the output section 4f to each other to transmit data. A clock circuit 4h sends out a clock signal at preset time intervals to the CPU 4a, the ROM 4b, the RAM 4c and so forth so that a control timing is set by the clock signal.

Figure 7:
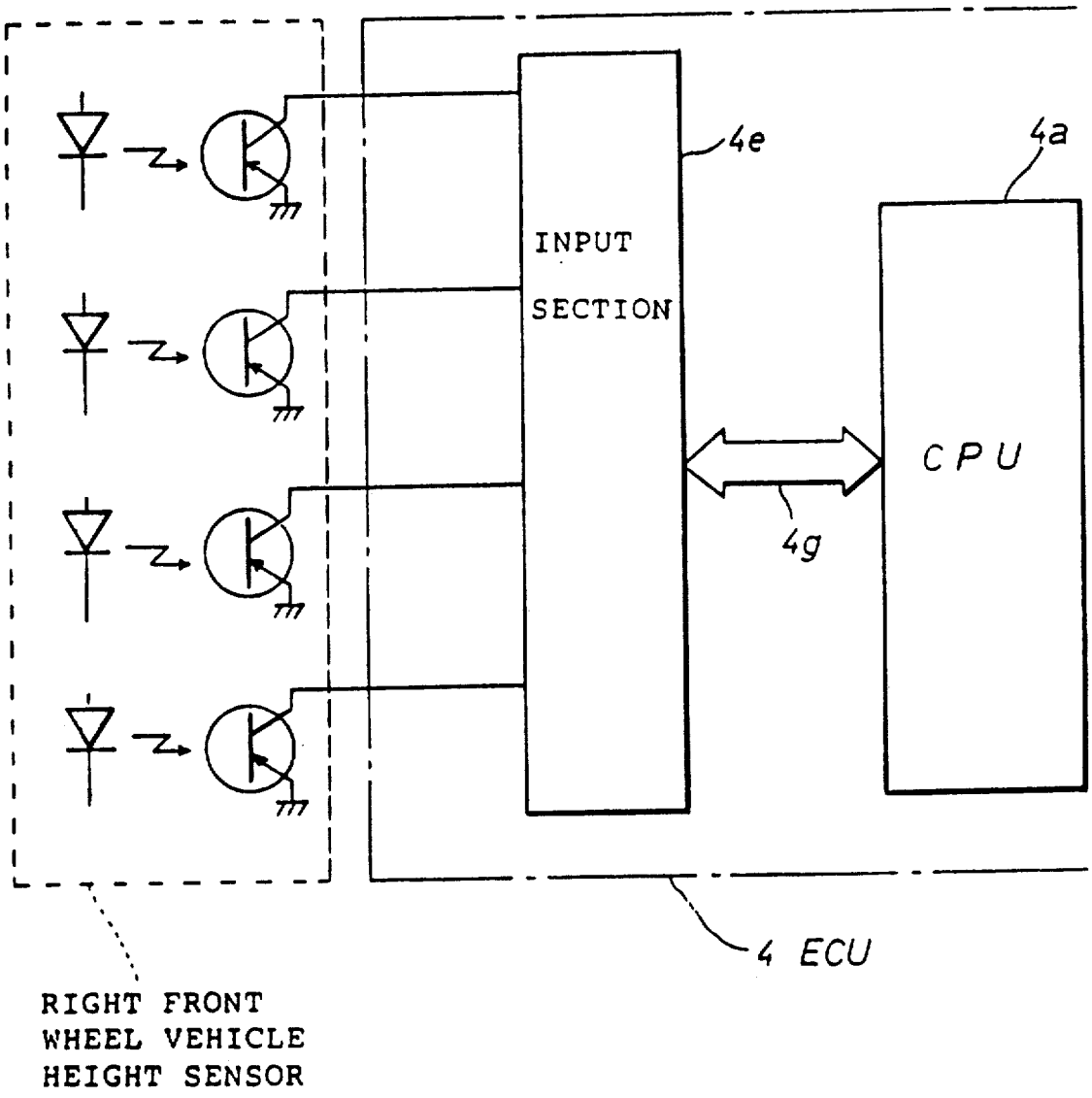
FIG. 7 shows a construction of an input section which receives a digital front wheel vehicle height signal.
Figure 8:
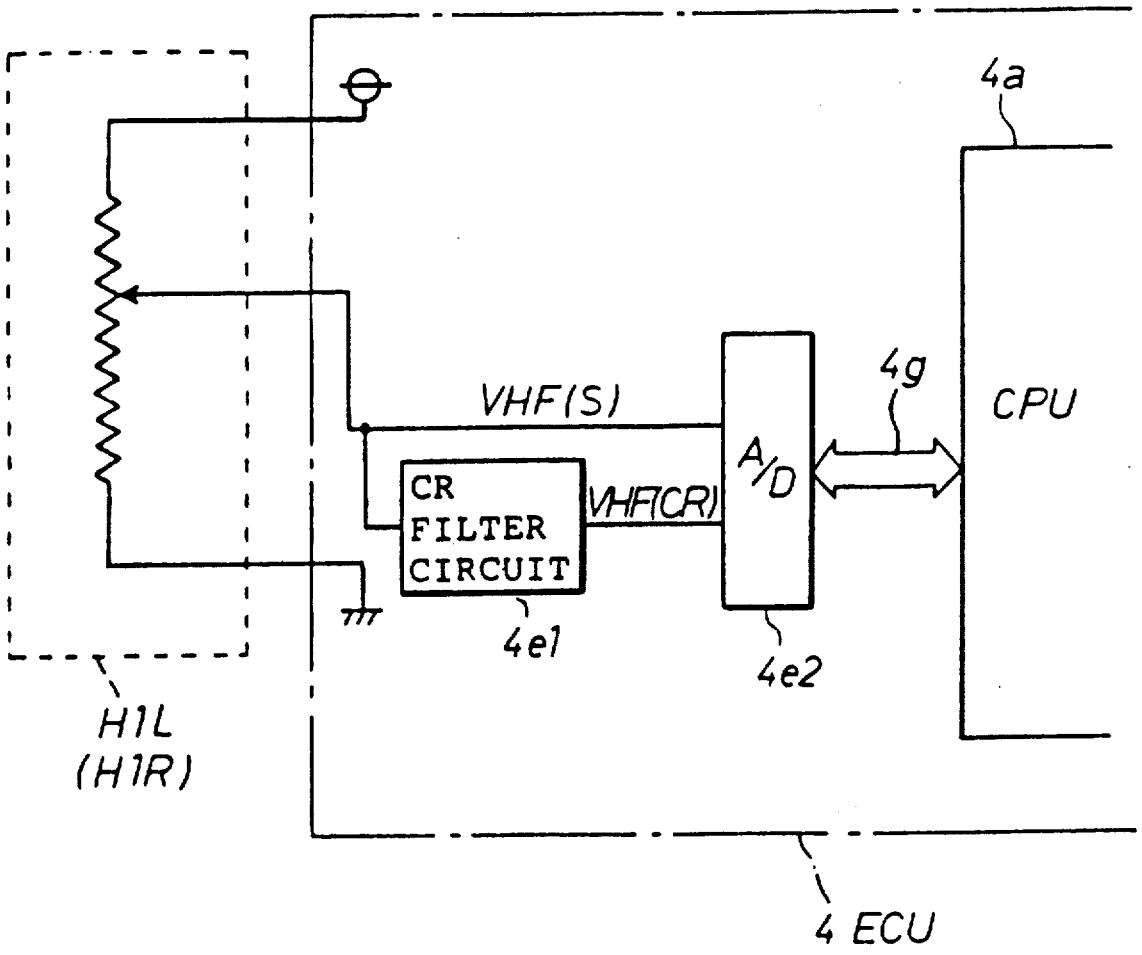
FIG. 8 shows a construction of an input section which receives an analog front wheel vehicle height signal.

If the output signal of the vehicle height sensor H1R is a digital signal, the signal is transmitted to the CPU 4a through the input section 4e including a buffer as shown in FIG. 7. If the output signal of the vehicle height sensor 1 is an analog signal, a construction as shown in FIG. 8 is provided. In the latter case, the vehicle height sensor H1R sends out the analog signal of a voltage corresponding to the height of the vehicle. The analog voltage signal is converted into a voltage VHF(CR) indicating an average height of the vehicle, by a CR filter circuit 4e1 which is a low-pass filter. The voltage VHF(CR) is applied to an A/D converter 4e2. The analog voltage signal is also directly applied as a voltage VHF(S) indicating the current height of the vehicle, to the A/D converter 4e2. The converter 4e2 changes both the input signals into digital signals through the action of a multiplexer. The digital signals are transmitted from the converter to the CPU 4a. The same thing applies to the left front wheel vehicle height sensor H1L.

The processings, which are performed by the ECU 4, are hereinafter described referring to a flow chart shown in FIG. 9. The flow chart indicates the processings performed by the ECU 4 in response to a vehicle height sensor H1R of the linear type which sends out an analog signal, as shown in FIG. 8. Numbers in the parentheses indicate Step numbers.

(1) A current vehicle height VHF(S) and an average vehicle height VHF(C) are determined (106).

(2) It is judged whether or not the driving state detection sensor SE1, SE2, SE3, SE4, and SE5 output signals (112).

(3) In case a detection of one of those signals, a vehicle posture control, e.g. anti-shift-squat, anti-brake-squat, or anti-role, corresponding to those signals is executed.

Above-mentioned vehicle posture control is usually to make each suspension 'hard' and to return to the normal conditions after that (113–121).

(4) If signals of driving state do not satisfy preset condition, it is judged if the current vehicle height is displaced more than a predetermined value h0 from the average vehicle height VHF(CR)(122).

(5) The characteristic of each of the suspensions for the rear wheels is altered 'soft', if the height signal is greater than the predetermined value (134). In other words, the main air chambers S2La, S2Ra and auxiliary air chambers S2Lb, S2Rb of the rear suspensions S2L, S2R are communicated with each other to decrease the spring constant. Or a damping force of shock absorbers S2Lc, S2Rc are decreased.

The above-mentioned operations (1)–(5) correspond to the main processings for producing the effect of the present invention, and still another operation (6) is added to the main operations (1)–(5) in the embodiment.

(6) Subsequently to the operations (1)–(5), the characteristic of each rear suspension is returned to the original state after the rear wheels have passed over the protrusion or hollow of the road surface (136–144).

The details of the processings are hereinafter described with FIG. 9. The processings are repeatedly performed in every 5 msec. It is firstly judged whether or not the processings are being performed for the first time since the activation of the ECU 4 (100). If the processings are judged to be being performed for the first time, initial setting is effected (102), all variables are cleared and all flags are reset. After the initial setting is effected (102) or if the processings in the routine are judged to be being performed for the second time or later, the speed V of the vehicle is detected (104) in terms of the output signal of the vehicle speed sensor SE5. A current vehicle height VHF(S) and an average vehicle height VHF(CR) is then detected by the front vehicle height sensor H1L and H1R (106).

To detect the current vehicle height, either of the outputs of the vehicle height sensors H1L and H1R for the right and left front wheels of the vehicle may be used. Since rear wheels receive a shock whichever of the front wheels has moved up or down due to the protrusion or hollow of the road surface, the average of the outputs of both the vehicle height sensors may be used or the larger one of the outputs may be used. An average of the past outputs of the vehicle height sensor H1R is determined to set an average vehicle height (550). In this embodiment, the average vehicle height VHF(CR) is directly determined from the output signal of the vehicle height sensor H1R through the CR filter circuit 4e1 which is shown in FIG. 8. If the vehicle height sesor H1R is sending out a digital signal, the average vehicle height VHF(CR) may be calculated from past vehicle heights VHF(S) measured in the ECU 4. For example, the calculation can be effected by adopting processings shown in FIG. 10, instead of adopting the processings in Step 106 shown in FIG. 9. In the processings shown in FIG. 10, the current vehicle height VHF(S)n is detected first (150), and an average VHFa,n of the vehicle height is the calculated (154, 156) in every predetermined operation unit time interval tms (152). In Step 154, the following calculation is performed:

$$VHFa,n = \{(k-1)VHFa,n-1 + VHFb,n-1 + VHF(S)n\}/k$$

k: Number of measured values to be averaged

VHFa,n: Average to be calculated currently (n-th time)

VHFa,n−1: Average calculated previously ((n−1)-th time)

VHF(S)n: Measured value of current vehicle height

VHFb,n−1: Value calculated previously for convenience to calculate the average VHFa,n In Step 156, the value VHFb,n is calculated as follows:

$$VHFb,n = \text{mod}(k)\{(k-1)VHFa,n-1 + VHFb,n-1 + VHF(S)n\}$$

In such calculation, mod (A){B} means the value of the remainder in the division of B by A. The processings in Steps 154 and 156 constitute such a simple method that a value approximate to the average can be calculated if only the values VHFa,n, VHFa,n−1 and VHFb,n−1 are stored in a memory beforehand. As for the simple method, past (k−1) pieces of data do not need to be stored in the memory, so that the space of the memory and the time of the calculation are saved. If the space of the memory and the time of the calculation are enough for use, a required number of measured values may be averaged normally.

Figure 9:
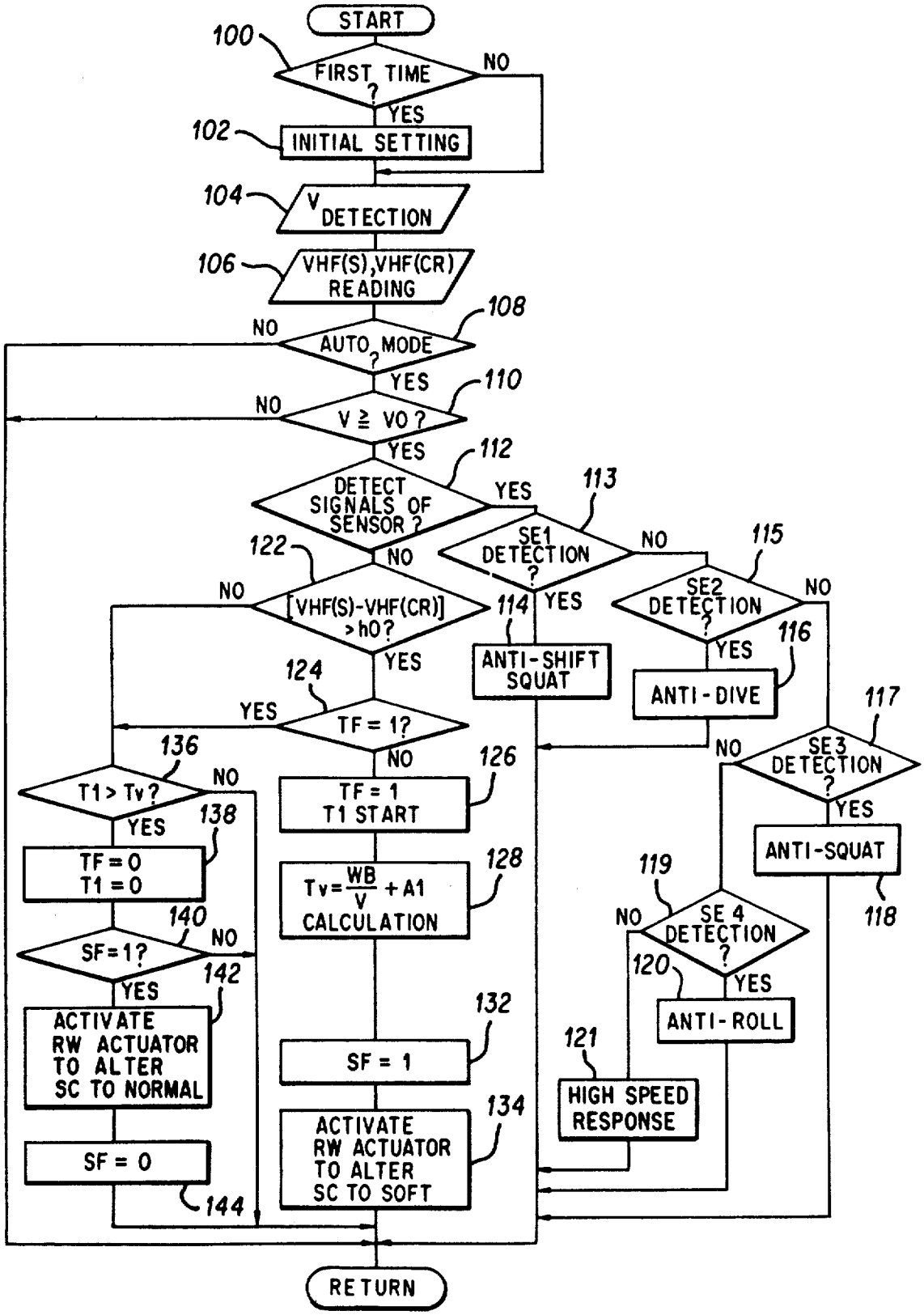
FIG. 9 shows a flow chart of processings which are performed in the ECU of the embodiment.
Figure 10:
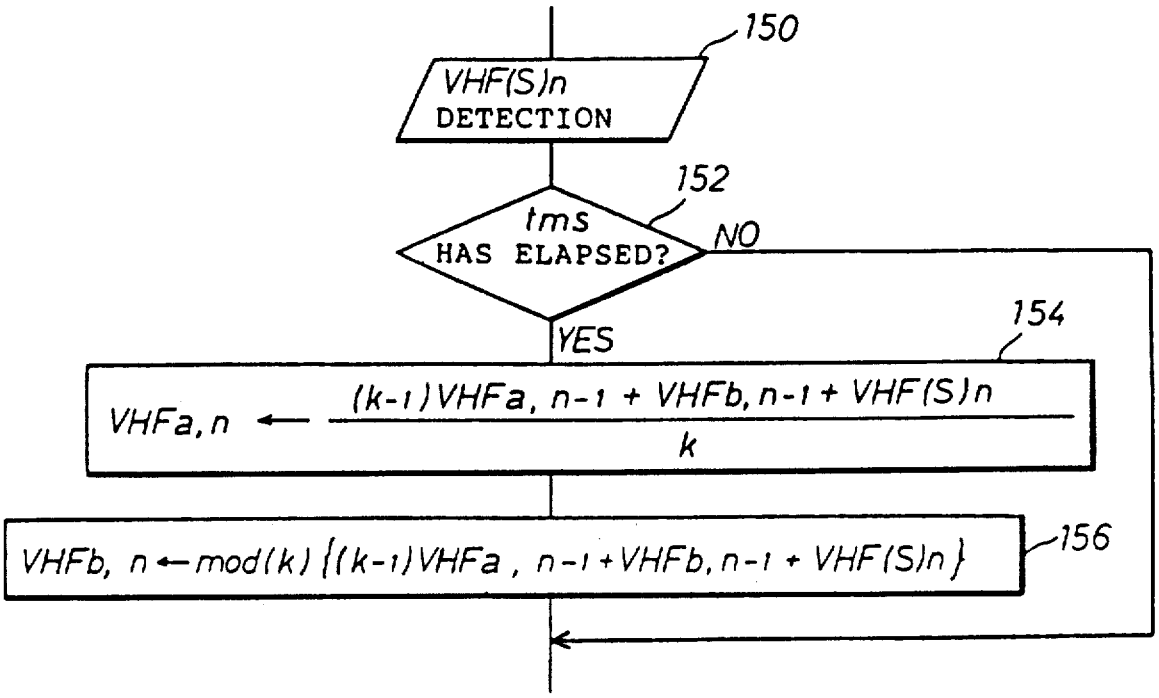
FIG. 10 shows a flow chart of some of the processings, which are for calculating an average value of the vehicle height signal.

After the detection of the average (106) as shown in FIG. 9, it is judged (108) whether or not the control of each suspension is in an automatic mode. If the driver of the vehicle has not selected the automatic mode by a manual switch, the processings in the routine are terminated. If he has selected the automatic mode, it is judged (110) whether or not the vehicle is moving. When the detected output of the vehicle speed sensor SE5 is not lower than a predetermined level, the vehicle is judged to be moving. If the vehicle is judged to be moving, it is then performed (104) to perform the following control in response to running of the vehicle after the comparison of the current vehicle speed detected by a vehicle speed sensor SE5 with the reference speed V0.

In the Step 112, the steering condition of the vehicle is judged whether or not in a predetermined condition in response to signals outputed respectively from driving condition sensors SE1, SE2, SE3, SE4, and SE5. In brief, it is judged the condition of the vehicle is whether or not in the condition requiring vehicle height control. If it is judged driving condition of the vehicle is in the predetermined condition, discrimination of the signals is performed to determine which condition is detected in Step 112, and a vehicle posture control is performed (113-121) commensurate with the respective driving condition of the vehicle.

In specific, it is judged the outputted signal is whether or not outputted from the neutral start switch SE1. If the case is so, the processings are advanced to Step 114, where anti-shift squat processing is performed. Namely, when an automatic transmission shift lever is positioned in P (parking) or N (neutral) range and the vehicle speed is lower than 10 km/h, the spring constants of the suspensions are increased and the damping force of the shock absorbers are made 'hard' to prevent the occurrence of squat.

This state (hard) is maintained for a predetermined time interval (e.g. for 5 [minutes] *seconds*) after a vehicle speed becomes higher than 15 km/h or after the neutral start switch SE1 is switched from 'ON' to 'OFF' ('OFF' means the shift lever is positioned in neither P nor N range) to alter the damping force to the normal condition at that time.

If the condition is not satisfied in Step 113, it is then judged the outputed signal is whether or not that from the brake lamp switch SE2. If the case is so, the processing is advanced to Step 116 to perform an anti-dive processings. Namely, the braking is performed when the vehicle is running at a speed higher than a predetermined value (e.g. 60 km/h), the suspension of the vehicle is altered to high spring constant (hard) to prevent the occurrence of a nose dive.

If the condition is not satisfied in Step 115, the processing Step is advanced to Step 117, the signal is judged whether or not that from the throttle position sensor SE3. If the result is 'YES', the processing Step is advanced to Step 118 to perform an anti-squat processing. Namely, if the ECU 4 judges the acceleration of the vehicle becomes larger on the basis of the detection of treadled degree of the accelerator pedal, damping force of the shock absorber of the suspension of each wheel is altered to be string (hard). This processing prevents the possible squat occurring when the vehicle start running. For a predetermined time interval (e.g., for 2 [minutes] *seconds*), the damping force is kept in the strong (hard) state, and after the predetermined time interval is elapsed, the damping force is returned to normal.

If the condition is not satisfied in Step 117, the processing Step is advanced to Step 119 to judged whether or not the signal is that from the steering sensor SE4. If the case is so, the process is advanced to an anti-roll processing. Namely, the damping force of the shock absorbers is altered to strong (hard). This alteration prevents the roll of the vehicle occurring when the vehicle turns a corner. For a predetermined time interval (e.g., for 2 [minutes] *seconds*), the damping force is kept in the strong state. However, when the driver turns back the steering wheel in driving a slalom road, or when the driver turns the steering wheel further in turning a cornr, the time interval for holding the strong damping force is increased from the predetermined time interval.

If the condition is not satisfied in Step 119, it is judged that the signal is that from the vehicle speed sensor SE5, the processing Step is advanced to Step 121 to perform high speed sensitive processing. It means that if the vehicle speed is higher than a first preset speed (e.g. 80 km/h), the damping force of the shock absorber of each wheel is increased to enhance the controllability and stability of the vehicle running at high speed. When the vehicle speed falls down below a second preset speed (e.g. 60 km/h), the damping force is returned to normal.

On the other hand, the processing Step is advanced to Step 122 if the driving condition signal detected by the driving condition sensors corresponds neither of the above mentioned predetermined conditions. In Step 122, it is judged whether or not the change in the front vehicle height exceeds a predetermined range by comparing the absolute value of the difference between the current front vehicle height VHF(S) and the averaged vehicle height VHF(CR) with a reference value h0. And the following control is performed if the change in front vehicle height exceeds to the predetermined range.

Figure 12:
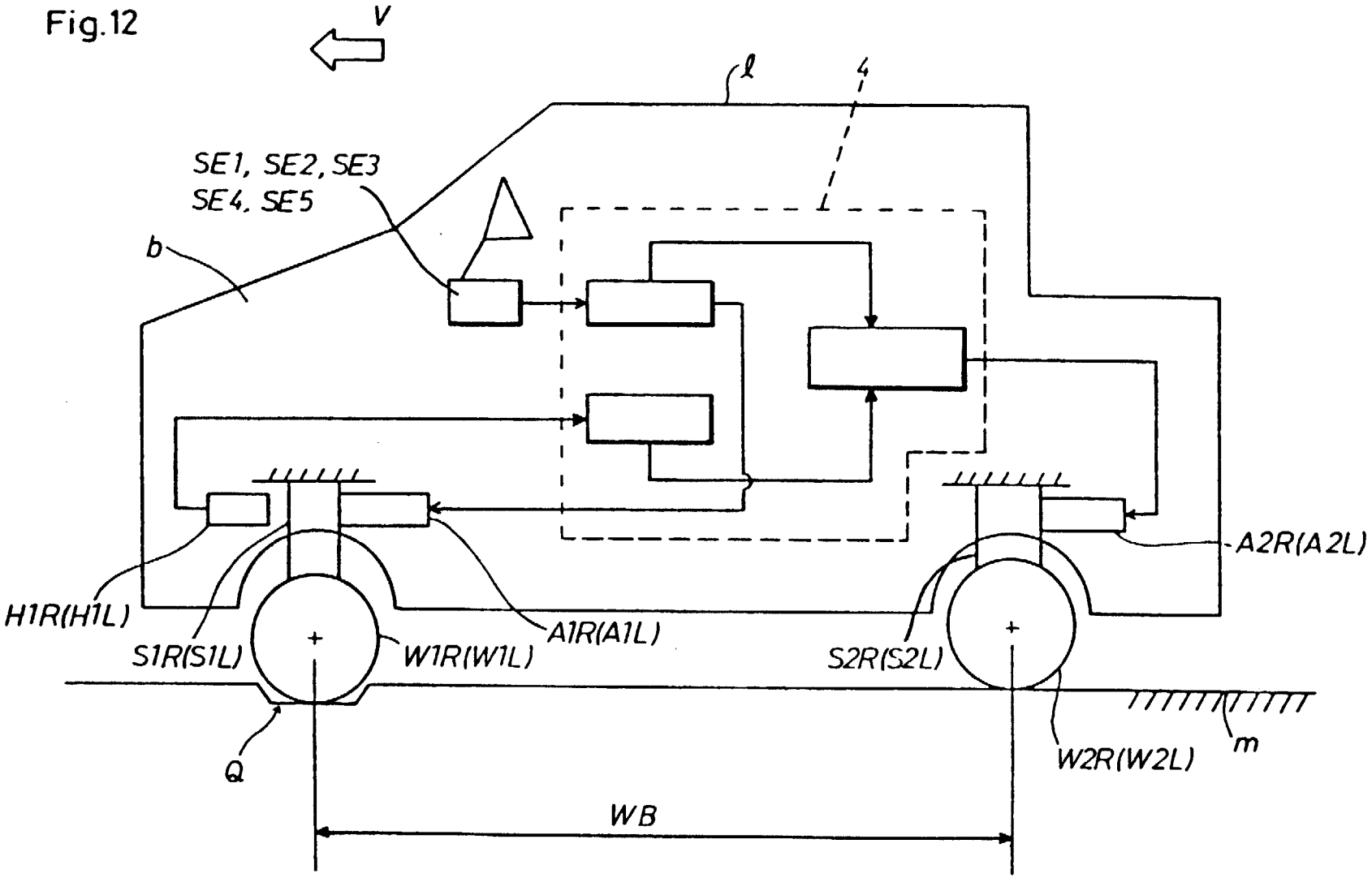
FIG. 12 shows diagrammatically a vehicle passing over a hollow for explaining an embodiment.

One example of the timing of the control is explained with reference to FIG. 12 and FIG. 13. FIG. 12 shows the state of the vehicle, the front wheels W1R or W1L riding on a hollow Q of the road surface m at a speed V.

Figure 13:
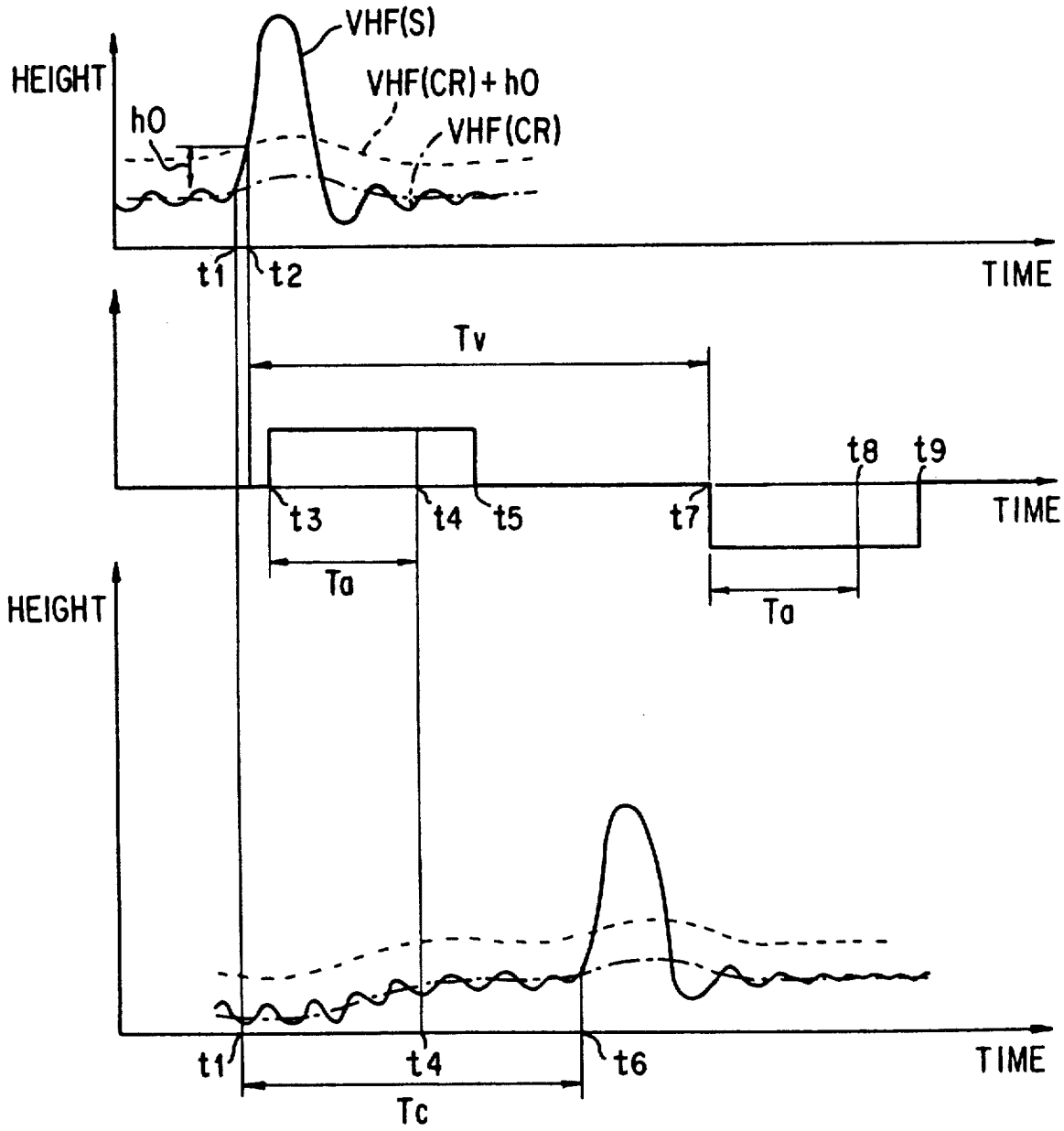
*FIG. 13 shows* time charts in relation to the processings of FIGS. 9, 10 and 11.

[FIG. 13A, FIG. 13B, and FIG. 13C are time charts respectively showing] *FIG. 13 shows time charts of* the changes in outputs from front vehicle height sensor H1R or H1L, and the rear suspension characteristic driving signals to the actuators A2R and A2L, and the vehicle height varied in accordance with the elapsed time.

In the FIG. 13, t1 indicates a time point when the front wheels W1R or W1L of the vehicle running on the flat road surface m as shown in FIG. 12, begin to pass the hollow Q of the road surface.

After the time point t1, VHF(S) outputed from vehicle height sensor H1R or H1L increases over the averaged vehicle height VHF(CR), and at a time point t2, it reaches to VHf(CR)+h0. At this time point, ECU 4 detects that the vehicle height data exceeds the predetermined range and at a time point t3 slightly later than the time point t2, the ECU 4 outputs a driving signal to the actuators A2R and A2L for altering the rear suspension characteristic to make 'soft' or lower the spring constant of the air spring by communicating the main air chambers S2Ra and S2La with the auxiliary air chambers S2Rb and S2Lb of the rear suspensions. That processing to alter rear suspension characteristic is terminated at a time point t4 which is a time interval Ta later than the time point t3. As for the actuators A2R and A2L, the drive electric current is applied until a time point t5. Rear wheels W2R and W2L begin to ride on the hollow Q of the road surface at a time point t6 after a time interval Tc, which is determined from the time interval between the front wheels and the rear wheels passing a same point, is elapsed after the front wheels W1R and W1L begin to ride on the hollow. Therefore, the time point t4 when the rear suspension alteration processing is terminated needs to precede the time point t6.

At a time point t7, which is a restore time interval Tv for keeping the rear suspension characteristic altered after the time point t2, the rear wheels W2R and W2L pass over the hollow Q of the road surface and resume running on the flat road surface. Therefore, the ECU 4 outputs a drive signal to the actuators for altering the rear suspension characteristic so as to change the rear suspension characteristic to normal. In response to this drive signal, the actuators for altering the rear suspension is operated to increase the spring constant of the air spring by discommunicating the main air chambers S2Ra and S2La and the auxiliary air chambers S2Rb and S2Lb of the rear suspensions S2R and S2L. The above processings for altering rear wheel suspension characteristic is terminated at a time point t8 at which a time interval Ta is elapsed from the time point t7. As for the actuators A2R and A2L, the driving current has been applied until a time point t9.

Details of the control for embodying the above-mentioned processings are explained in view of FIG. 9 as explained above. In Step 124, the value of the flag TF is detected to determine whether or not the alteration of the rear suspension is going on. In this case, TF equals to 0 that means 'NO' in Step 124. Then the processing Step is advanced to Step 126. The flag TF is set for indicating that the alteration of rear suspension characteristic is going on, while starting a timer T1 for counting rear suspension characteristic restore time. In Step 128, a calculation of the restore time interval Tv is carried out. If the current vehicle height and the wheel base are abbreviated as V (m/s) and WB (m) respectively, the time interval Rv (s) for restoring rear suspension characteristic is induced by the following formula, taking the time interval from the time point when the front wheels meet a hollow or protrusion of the road surface to the time point when rear wheels reaches it into consideration.

$$Tv = WB/V + A1.$$

In the above formula, A1 means a correction factor. In the following Step 132, a flag SF is set for indicating the rear suspension characteristic is in the condition of 'soft'. Next, the processing is advanced to Step 134, rear wheel suspension characteristic is altered to 'soft' by driving the actuators A2R and A2L for altering rear suspension characteristic.

Figure 11:
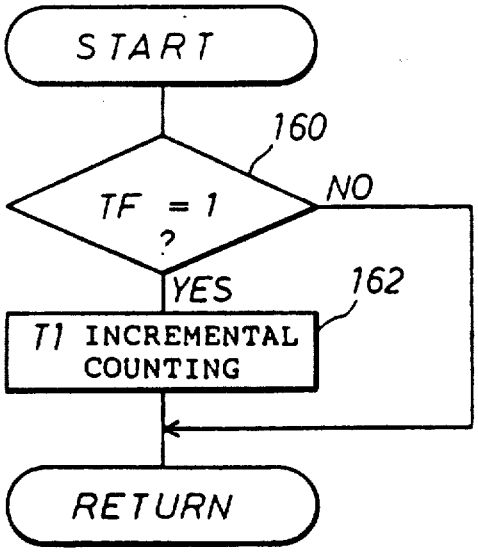
FIG. 11 shows a flow chart of some of the processings, which correspond to an incremental counting of a timer.

In Step 136, the timer T1 for counting a restore time is compared with the restore time interval Tv, and rear suspension characteristic is kept in the condition of 'soft' after the time interval Tv is elapsed from the time point when the control is performed for the rear suspension characteristic. In Step 160 of a timer counting routine shown in FIG. 11, a flag TF is judged whether or not the control of the rear suspension characteristic is going on, and in Step 162, the timer T1 is counted up in response to the control of rear suspension characteristic.

Returning to FIG. 9, if it is judged the timer T1 has elapsed the restore time interval Tv in step 136, the processing Step is advanced to Step 138 to reset the flag TF and the timer T1. In Step 140, the rear suspension characteristic is judged whether or not in the condition of 'soft' on the basis of the value of the flag SF. The processing Step is advanced to Step 142 as the rear suspension characteristic is in the condition of 'soft' this time. In Step 142, the rear suspension characteristic is altered to the condition of 'normal' by driving the actuators AR2 and AL2. Then the processing is advanced to Step 144 to reset the flag SF indicating 'soft' of rear suspension characteristic. After this processing Step, the above-mentioned routine ends. The routine is performed repeatedly in response to the condition of the road surface as explained above.

Embodiment of the present invention is constructed such that it is capable of minimizing shocks and vibrations when the rear wheels passes over a hollow or a protrusion by performing alteration control of the rear suspension characteristic to 'soft' or lowering the spring constant of the air spring before the rear wheels ride on the hollow or the protrusion which the front wheels has already passed over.

Further, preventing shock of rear wheels leads to the prevention of whole shock of the vehicle, as the shock of the rear wheels affects unpleasant vibration not only to the rear seats but also the front seats.

Moreover, as the control of the embodiment according to the present invention includes restoring the rear suspension characteristic to the normal condition again, good drivability and stability of the vehicle is realized both when the vehicle is running over a hollow or a protrusion of a road surface and when running on a flat surface after passing it.

Still further, according to the embodiment of the present invention, as the vehicle height control in response to the predetermined driving condition is performed prior to the above-mentioned rear suspension control on the basis of a judgment whether the vehicle is running on over a single protrusion or the hollow. High level drivability and controllability is realized regardless of the road surface condition and the driving condition.

While in the above embodiment the air suspension or the shock absorbers are changed into two stages, 'hard' and 'normal', the rear wheel suspensions may alternatively changed into [two] *three* stages (e.g., 'hard', 'normal' and 'soft'). The three stage control or a plural stage control is realized, for example, by making the air suspensions to have more than three stages of the spring constant, by making the shock absorbers to have more than three stages of the damping force or by using both the two apparatuses. Such a control can realize a fine control of the rear suspension characteristic so as to cope with every size and type of hollow and protrusion of the road surface.

While according to the above described embodiment, the spring constant of the air suspension or the damping force of the shock absorber is changed, a control means for changing the vehicle height can be adopted. The means includes, for example, the compressed air inhale and exhale system and inhale and the exhale valve of each air suspension which can alter the vehicle height at multiplied stages. It leads to a realization to perform vehicle height control when a vehicle is running on a road surface having sporadic protrusions or hollows to improve the drivability and stability of the vehicle.

The above embodiment is performing control to make the suspension characteristic 'soft' in running on a ground having sporadic protrusions or hollows, aiming ride comfort in the main. However, it is admissible of performing a control to make the suspension characteristic to 'hard' aiming good controllability and stability.

Figure 14A:
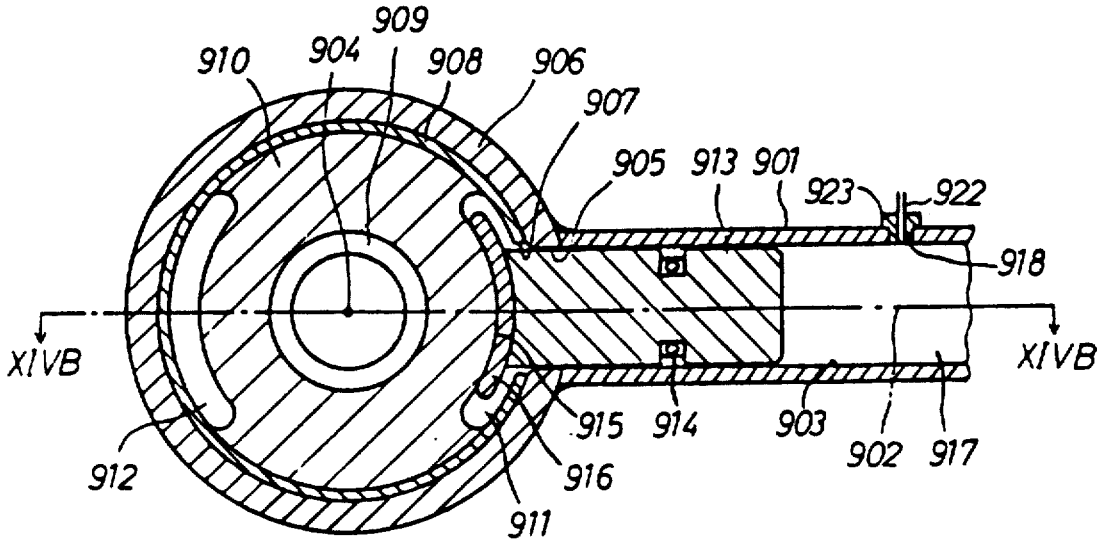
FIGS. 14A and 14B show sectional views of a variable-stiffness bush used in a suspension characteristic alteration means.
Figure 14B:
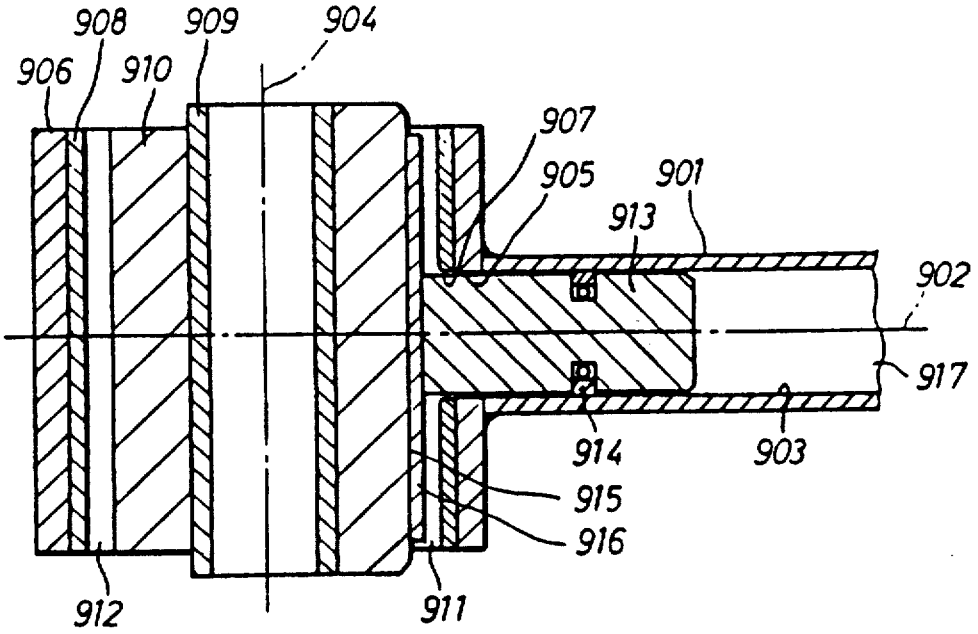

Examples of other suspension characteristic alteration means not for any air suspension are described below. The first example is bush for a joint of a suspension bar such as the upper and lower control arms of a suspension, as shown in FIGS. 14A and 14B. The bush is provided with a mechanism for changing the stiffness of the bush to alter the characteristic of a suspension. The changing of the stiffness means that of the spring constant or damping force of the bush.

FIG. 14A shows a longitudinal sectional view of the joint of the suspension bar. FIG. 14B shows a sectional view along a line X1VB—X1VB shown in FIG. 14A. A control arm 901 extends along an axis 904 perpendicular to the axis 902. A sleeve 906 which has a hole 905 is welded around the hole at one end of the control arm 901. An outer cylinder 908 having a hole 907 is press-fitted in the sleeve 906. An inner cylinder 909 is provided in the outer cylinder 908 concentrically thereto. The bush 910 made of vibration-proof rubber is interposed between the outer cylinder 908 and the inner cylinder 909. The bush 910 and the outer cylinder 908 define openings 911 and 912 which are located in the face of each other along the axis 902 and extend as arcs around the axis 904, so that the stiffness in the direction of the axis 902 is set at a relatively low value.

The hole 903 of the control arm 901 constitutes a cylinder which supports piston 913 movably back and forth along the axis 902. A sealing member 914 is tightly packed in between the piston 913 and the inside surface of the hole 903. A contact plate 916 is secured at one end of the piston 913. The contact plate 1916 curves about the axis 904 and extends along the axis so that the plate is brought into contact with the inside surface 915 of the opening 911.

The same construction as shown in FIGS. 14A and 14B is provided at the other end of the control arm 901. A cylinder chamber 917 is defined between the piston 913 and another piston not shown in the drawings and fitted with the other end of the control arm 901. The cylinder chamber 917 communicates with the exterior through a tapped hole 918 provided in the control arm 901. A nipple 923 secured on one end 922 of a conduit connected to an oil pressure source not shown in the drawings is secured in the tapped hole 918 to apply oil pressure to the cylinder chamber 917. When the oil pressure in the cylinder chamber 917 is relatively low, the force pushing the piston 913 leftward as to the drawings is so weak that the piston is held in such a position shown in the drawings that the contact plate 916 is brought into light contact with the inner surface 915 of the bush 910. As a result, the stiffness of the bush 910 in the direction of the axis 902 is made relatively low.

When the oil pressure in the cylinder 917 is relatively height, the piston 913 is driven leftward as to the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is heightened.

If the suspension bar is provided between the body and rear wheel of a vehicle, the characteristic of the suspension for the rear wheel can be altered by the regulating the oil pressure in the cylinder chamber 917 through the action of an actuator such as a pressure control valve. When the oil pressure is heightened by an instruction from an ECU 4, the stiffness of the bush 910 is enhanced to increase the damping force and spring constant of the suspension to improve the controllability and the stability of the vehicle. When the oil pressure is lowered, the shock at the rear portion of the vehicle is reduced.

Figure 15A:
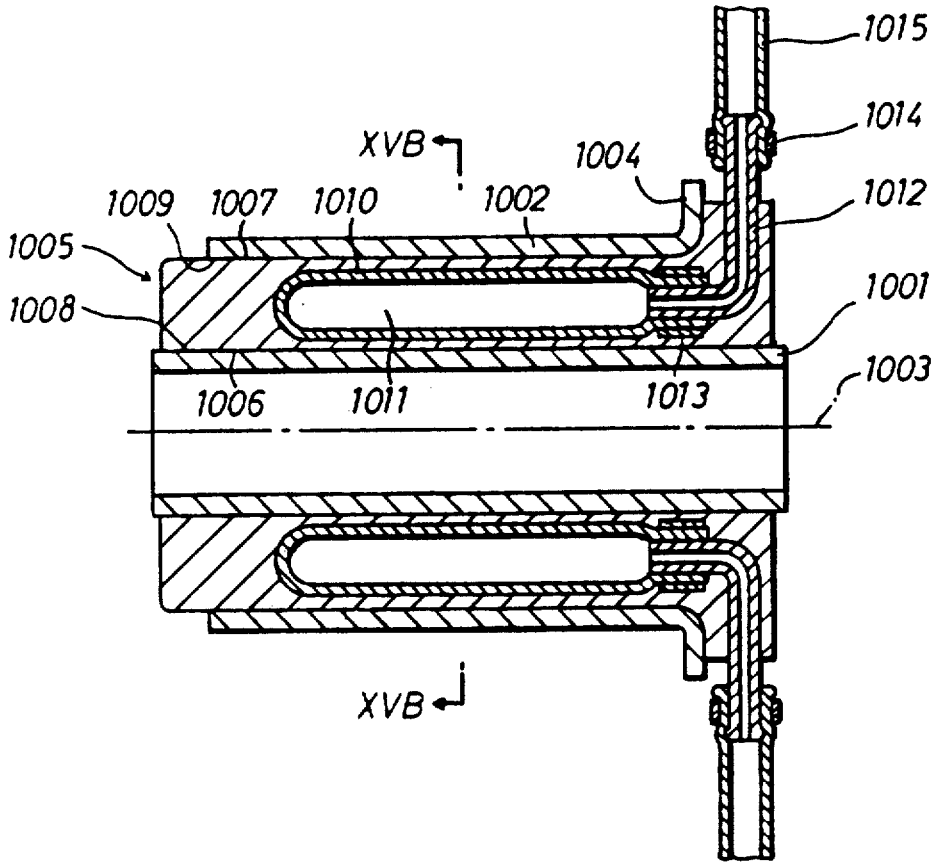
FIGS. 15A and 15B show sectional views of another variable-stiffness bush.
Figure 15B:
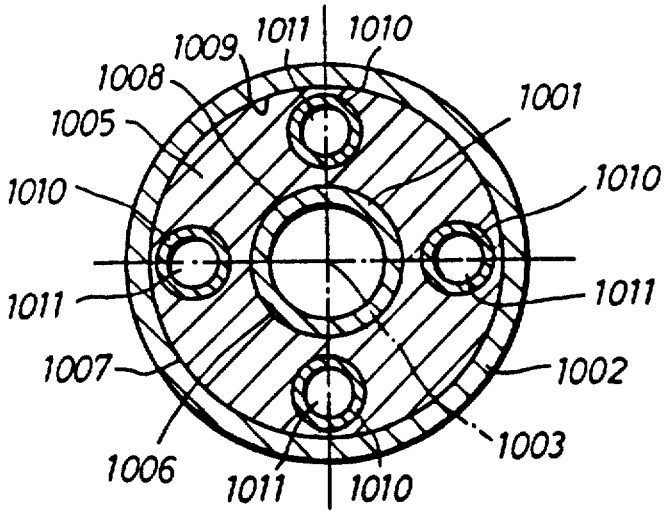

The second example is another bush shown in FIGS. 15A and 15B and having the same function as the former. FIG. 15A shows a longitudinal sectional view of the bush constructed together with an inner and an outer cylinders as a bush assembly. FIG. 15B shows a sectional view along a line XVB—XVB shown in FIG. 15A. Four expansible and compressible hollow bags 1010, which extend along an axis 1003 and are separately located in equiangular positions around the axis, are embedded in the bush 1005, and define four chambers 1011 extending along the axis 1003 and separately located in equiangular positions around the axis.

Each hollow bag 1010 is secured at one end on one end of a coupler 1012 embedded in the bush 1005, by a clamp 1013, so that the chamber 1011 communicates with the exterior of the bush through the coupler 1012. One end of a hose 1015 is fixedly connected to the other end of the coupler 1012 by clamp 1014, and the other end of the hose 1015 is connected to a compressed air source through an actuator such as a pressure control valve not shown in the drawings, so that controlled air pressure can be introduced into each chamber 1011. When the actuator is put in operation by an ECU 4.

The air pressure in each chamber 1011 can be varied to change the stiffness of the bush in a stepless manner. The stiffness of the bush can thus be appropriately changed to be high (hard) or low (soft) after a shock at the front wheel of a vehicle is detected.

Figure 16B:
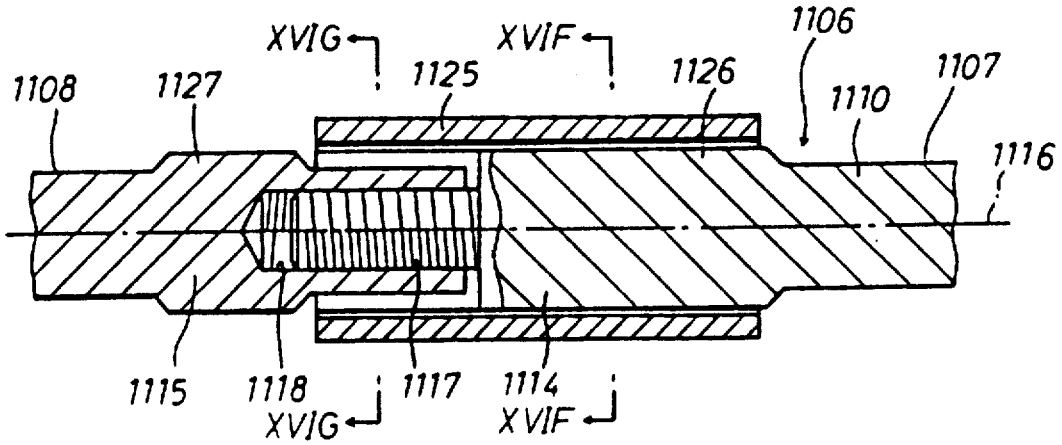
Figure 16C:
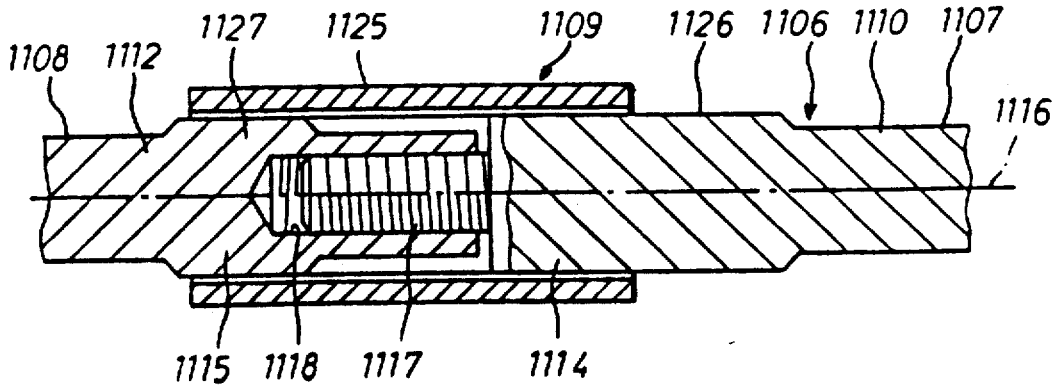
Figure 16D:
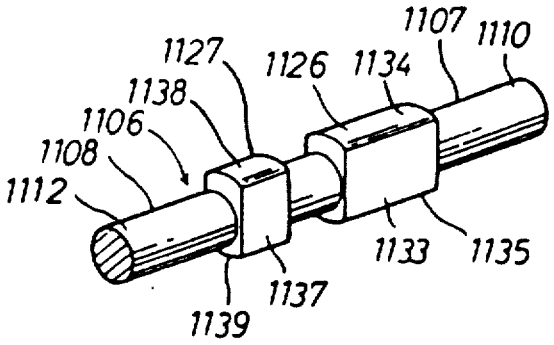
Figure 16E:
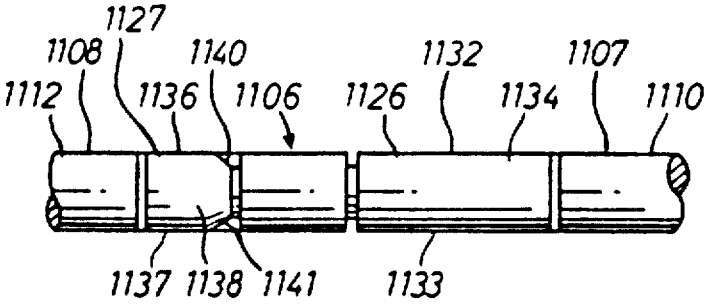
Figure 16F:
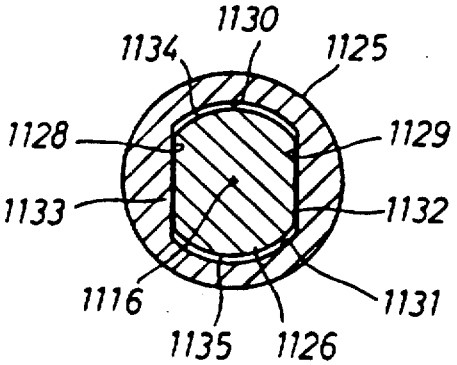
Figure 16G:
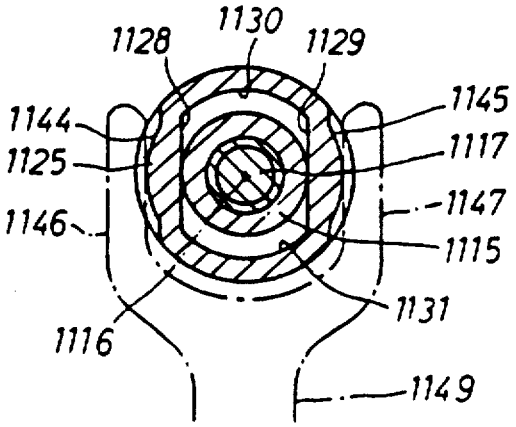

FIGS. 16A–16G show a construction of a stabilizer as the third example. FIG. 16A shows a exploded oblique view of the torsion-bar-type stabilizer built in the axle-type rear suspension of an automobile. FIGS. 16B and 16C show enlarged partial longitudinal sectional views of the main part of the stabilizer in the coupled and uncoupled states thereof. FIG. 16D shows an oblique view of the main part shown in FIGS. 16B and 16C and removed of a clutch. FIG. 16E shows a plan view of the main part shown in FIG. 16D. FIG. 16F shows a sectional view along a line XVIF—XVIF shown in FIG. 16B. FIG. 16G shows a sectional view along a line XVIG—XVIG shown in FIG. 16B. An axle 1103 coupled with wheels 1102 is rotatably supported by an axle housing 1101. A pair of brackets 1104 and 1105 are secured on the axle housing 1101, in positions separated from each other in the direction of the width of the automobile. The torsion-bar-type stabilizer 1106 is coupled to bushes not shown in the drawings. The stabilizer 1106 includes a right portion 1107 and the left portion 1108 can be selectively coupled to each other integrally by a coupling unit 1109. A protrusion 1117 and a hole 1118, which extend along an axis 1116, are formed at the ends 1114 and 1115 of rods 1110 and 1112 opposite arms 1111 and 1113, and are provided with a male screw and a female screw which are engaged with each other to couple the rods 1110 and 1112 rotatably relative to each other around the axis 1116. The tips of the arms 1111 and 1113 are coupled to brackets 1123 and 1124 secured on the side frames 1121 and 1122 of the vehicle, by links 1119 and 1120. The coupling unit 1109 includes the cylindrical clutch 1125, a clutch guide 1126 which is provided at one end 1114 of the rod 1110 and supports the clutch 1125 unrotatably relative to the guide around the axis 1116 but movably back and forth along the axis, and a clutch bearer 1127 which is provided at the end 1115 of the rod 1112 and bears the clutch 1125 unrotatably relative to the bearer around the axis 1116.

The inside circumferential surface of the clutch 1125 includes planes 1128 and 1129 facing each other across the axis 1116 and extending in parallel with each other along the axis, and partially cylindrical surfaces 1130 and 1131 adjoining the planes in positions opposed to each other across the axis 1116, as shown in FIGS. 16F and 16G. Correspondingly to the inside circumferential surface of the clutch 1125, the peripheral surface of the clutch guide 1126 includes planes 1132 and 1133 facing each other across the axis 1116 and extending in parallel with each other across the axis, and partially cylindrical surfaces 1134 and 1135 adjoining the planes in position opposed to each other axis 1116. The peripheral surface of the clutch bearer 1127 include planes 1136 and 1137 facing each other across the axis 1116 and extending in parallel with each other along the axis, and partially cylindrical surfaces 1138 and 1139 adjoining the planes in position opposed to each other across the axis 1116. The planes 1132 and 1133 of the clutch 1126 are always engaged with those 1128 and 1129 of the clutch 1125. When the clutch 1125 is in a position shown in FIG. 16C, the planes 1136 and 1137 of the clutch bearer 1127 are also engaged with those 1129 and 1128 so that the right portion 1107 and left portion 1108 of the stabilizer are integrally coupled to each other unrotatably relative to each other around the axis 1116. The ends of the planes 1136 and 1137 of the clutch bearer 1127 at the right portion 1107 of the stabilizer are chamfered at 1140 and 1141 so that even if the rods 1110 and 1112 are slightly rotated relative to each other around the axis 1116, the clutch 1125 can be moved from a position shown in FIG. 16B to a position shown in FIG. 16C, to couple the right portion 1107 and left portion 1108 of the stabilizer integrally to each other as the arms 1111 and 1113 of the portions are on the same plane. The clutch 1125 is moved back and forth along the axis 1116 by an actuator 1142 regulated by an ECU 4. The actuator 1142 includes a hydraulic piston-cylinder unit 1143 secured on a differential casing not shown in the drawings, and a shifting fork 1149 which includes arms 1146 and 1147 engaged in the grooves 1144 and 1145 of the peripheral surface of the clutch 1225, as shown in FIG. 16G, and is coupled to the piston rod 1148 of the piston-cylinder unit 1143. When the clutch 1125 is placed in a position shown in FIG. 16C, by the actuator 1142 according to an instruction from the ECU 4, the right portion 1107 and left portion 1108 of the stabilizer 106 are integrally coupled to each other to put the stabilizer in such a state that it can fulfill its function to reduce the rolling of the vehicle to improve its controllability and stability. When the clutch 1125 is placed in a position shown in FIG. 16B, by the actuator 1142, the right portion 1107 and left portion 1108 of the stabilizer 1016 can be rotated relative to each other around the axis 1116 to reduce the shock on the vehicle, particularly the shock on its wheels on only one side of the vehicle, or improve the feeling of ride of the vehicle.

Figure 17A:
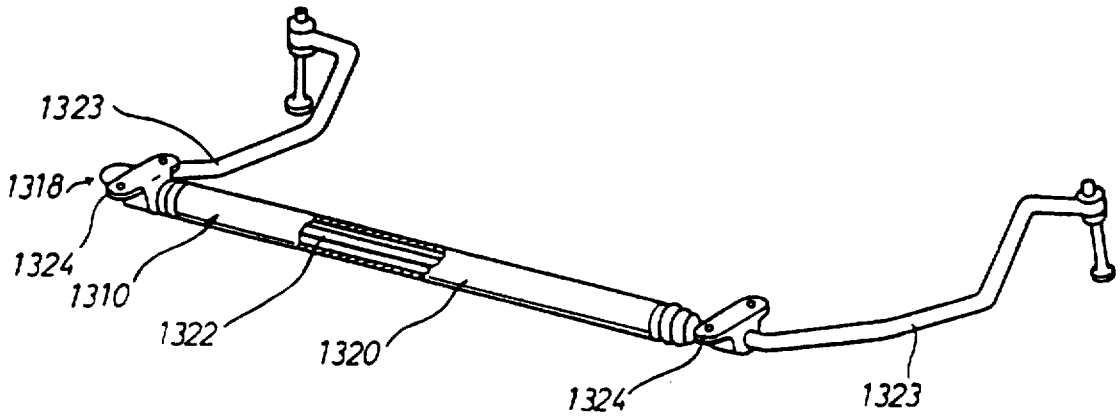
FIGS. 17A and 17B show a construction of another variable-stiffness stabilizer.
Figure 17B:
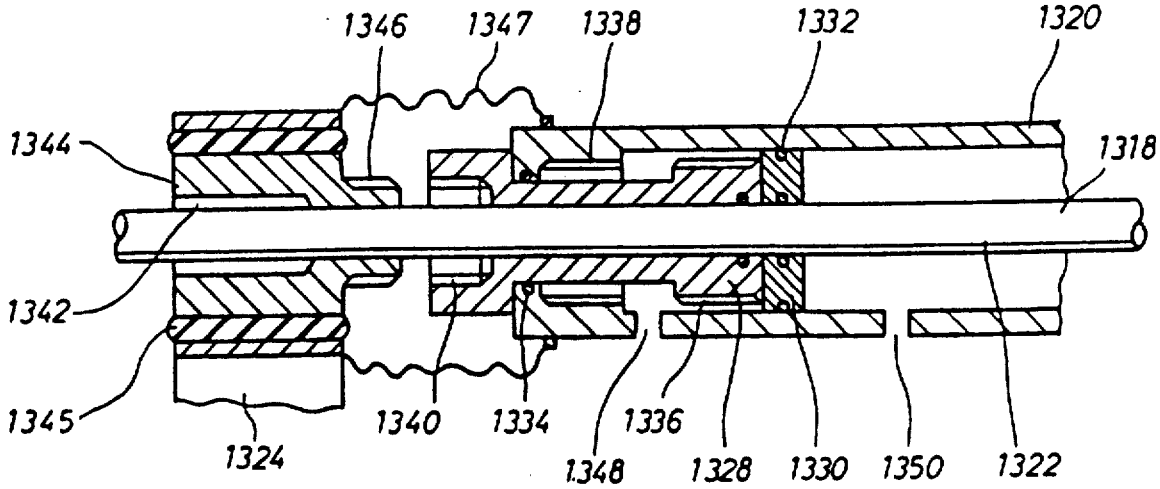

FIGS. 17A and 17B show another stabilizer as the fourth example. A stabilizer-bar-type assembly 1310 includes a first stabilizer bar 1318 and a second stabilizer bar 1320, as shown in FIG. 17A. The first stabilizer bar 1318 includes a main portion 1322 and an arm 1323. The main portion 1322 is attached to the body of a vehicle by a pair of fitting metals 1325 so that the main portion 1322 can be twisted around its axis. The second stabilizer bar 1320 is hollow so that the main portion 1322 of the first stabilizer bar 1318 extends through the second stabilizer bar, as shown in FIG. 17B. The second stabilizer bar 1232 is disposed inside the pair of fitting metals 1324 so that the first stabilizer bar 1318 can be connected to and disconnected from the second stabilizer. A piston 1330 on which a spool 1328 is secured is slidably disposed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end of the spool. A coupler 1344 is connected to the main portion 1322 of the first stabilizer bar 1318 by splines 1342. Splines 1346, which can be engaged with the splines 1340, are provided on the coupler 1344 at the end opposed to the spool 1328. The coupler 1344 is connected to a mounting metal 1324 through a rubber bush 1345, as shown in FIG. 17B, so that the main portion 1322 of the first stabilizer bar 1318 is twisted by deforming the coupler 1344 is fitted in such a position that the splines 1340 are engaged with the splines 1346 when the spool 1328 is moved leftward as to the drawings and the splines 1336 are engaged with the splines 1338. A bellowslike boot 1347 for protecting the splines 1340 and 1346 from dust is provided between the coupler 1344 and the second stabilizer bar 1320. Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 through an actuator such as a pressure control valve, the piston 1330 is moved leftward as to the drawings, together with the spool 1328, the splines 1336 are engaged with the splines 1338, and the splines 1340 are engaged with the splines 1346. As a result, the first and the second stabilizer bars 1318 and 1320 are coupled to each other so that the stiffness of the stabilizer bar assembly is heightened. When the pressure fluid is led to the outer port 1348, the piston 1330 is moved rightward and the splines are disengaged from each other. As a result, the stiffness of the stabilizer bar assembly is constituted by only that of the first stabilizer bar 1318.

Figure 18A:
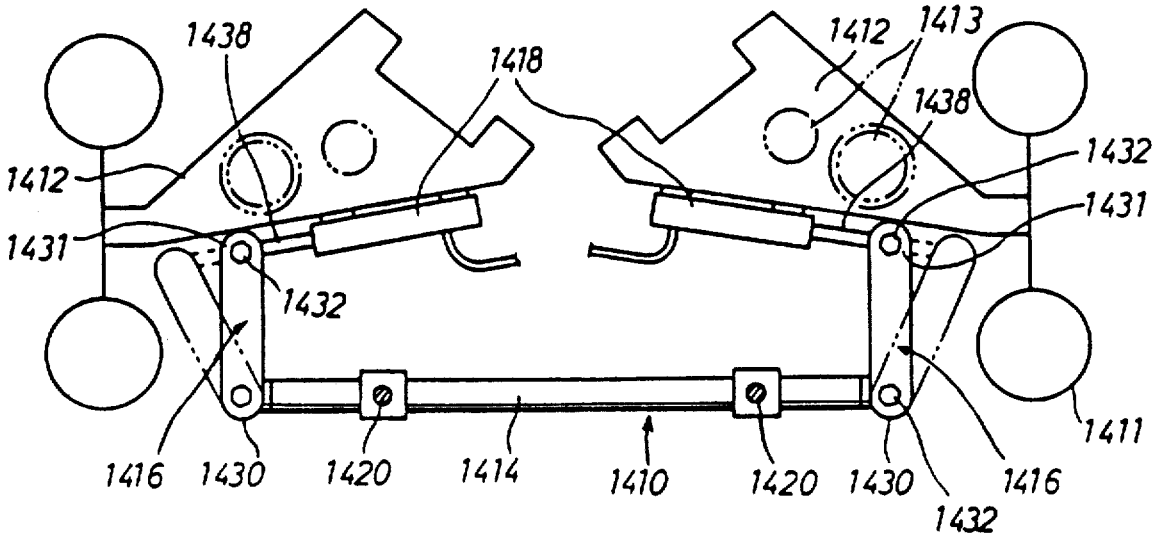
FIGS. 18A, 18B and 18C show a construction of still another variable-stiffness stabilizer.
Figure 18B:
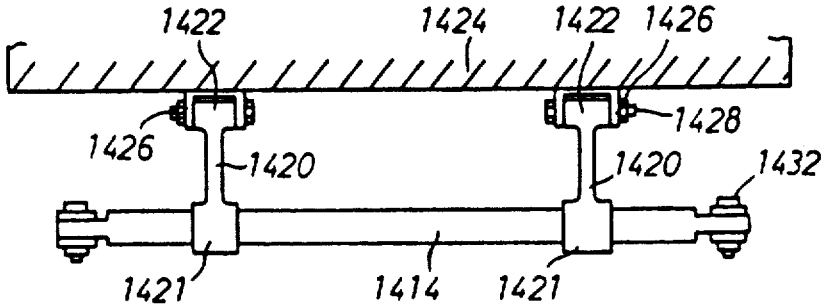
Figure 18C:
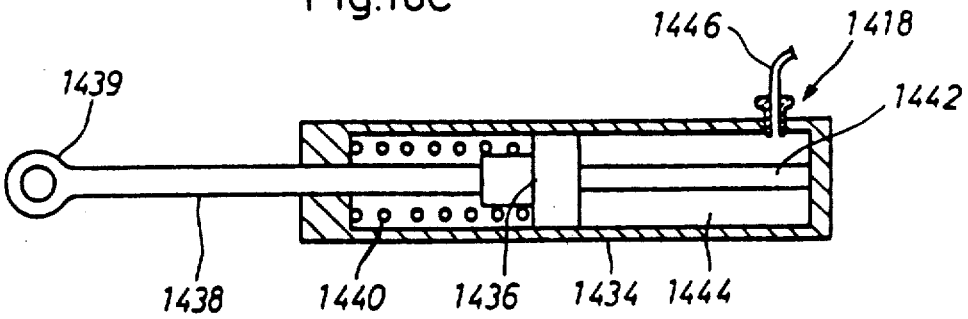

FIGS. 18A, 18B and 18C show still another stabilizer as the fifth example. FIG. 18A shows a plan view of the outline of the stabilizer 1410. Wheels 1411 and suspension arms 1412 are also shown in FIG. 18A. A main part 1414, a pair of arms 1412 are also shown in FIG. 18A. A main part 1414, a pair of arms 1516 and elongation means 1518 are provided. The main part 1414 like a round bar is laid through the bearing portions 1421 of a pair of links 1420 disposed at a distance from each other in the direction of the width of the body 1424 of a vehicle, and is supported by the bearing portions 1421 so that the main part 1414 can be twisted around its axis. The other bearing portions 1422 of the links 1420 at the upper ends are rotatably supported by pins 1428 extending through brackets 1426 welded on the vehicle body 1424. As a result, the main part 1414 is disposed along the width of the vehicle body, and can be twisted relative to the vehicle body. The pair of arms 1416 are made of flat bars. The first ends 1430 of the arms 1416 are coupled to the ends of the main part 1414 by blots and nuts 1432 so that the arms can be turned about vertical axes. The second ends 1431 of the arms 1416 are located at a distance from the first ends 1430 in the front-to-rear direction of the vehicle body 1424. Said front-to-rear direction includes an oblique longitudinal direction. The second ends 1431 of the arms 1416 are displaced in the direction of the width of the vehicle body 1424 by the elongation means 1418 made of power cylinders. Each of the power cylinders includes a cylinder 1434, a piston 1436 liquid-tightly and slidably fitted in the cylinder 1434, a piston rod 1438 coupled at one end to the piston 1416 and projecting at the other end out of the cylinder 1434, and a included spring 1440 for displacing the piston 1436 in such a direction as to retract the piston rod 1438. A stopper 1442 secured on the piston 1436 prevents the piston from being displaced more than a predetermined quantity. The cylinder 1434 is secured on the suspension arm 1412 in such a manner that the piston rod 1438 is located more outside than the cylinder 1434 in the direction of the width of the vehicle body. The second end 1431 of the arm 1416 is coupled to the outwardly projecting end of the piston rod 1438 by a bolt and nut 1432 so that the arm 146 can be turned about the vertical axis. One end of a flexible hose 1446 is connected to the liquid chamber 1444 of the cylinder 1434 opposite the side on which the included spring 1440 is located. The other end of the flexible hose 1446 is connected to a pressure generator (not shown) through an actuator such as pressure control valve. Unless pressure is applied to the liquid chambers 1444 of the power cylinders according to the state of the actuator corresponding to an instruction from an ECU 4, the second end 1431 of the arms 1416 are located in inner positions as shown in FIG. 18A, so that the wheel rate of the stabilizer is low. When the actuator is operated to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as shown by imaginary lines, i.e. double dotted chain lines, in FIG. 18A, to increase the arm ratio of the stabilizer to heighten its stiffness against the rolling of the vehicle.

Figure 19A:
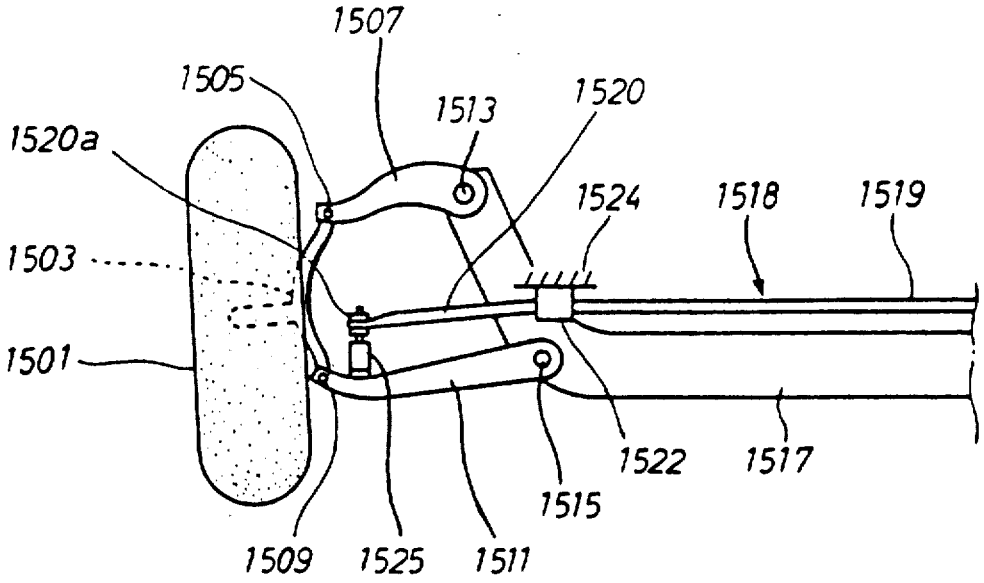
FIGS. 19A and 19B show a construction of a unit for coupling a variable-stiffness stabilizer and a lower control arm to each other.
Figure 19B:
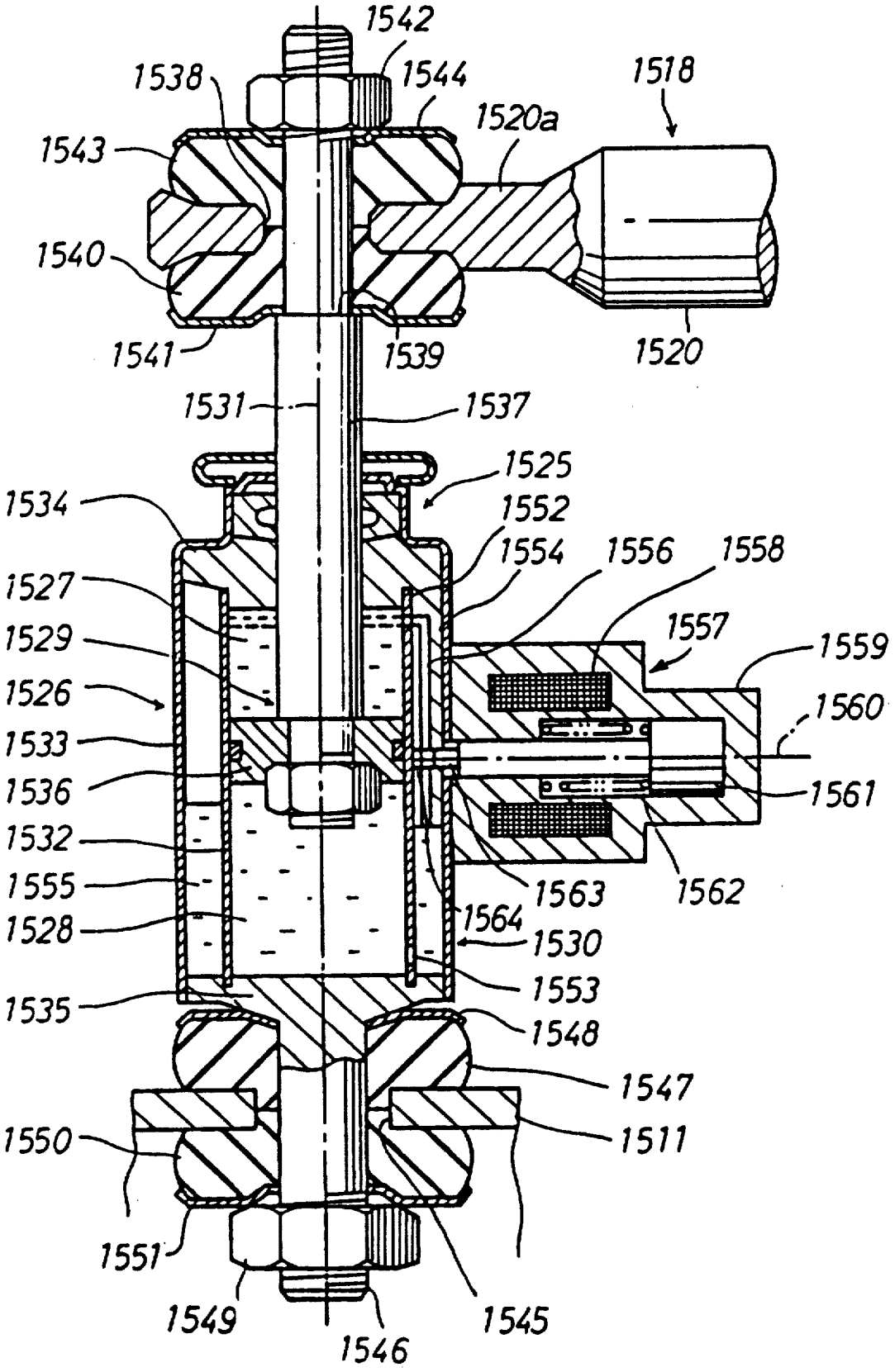

FIGS. 19A and 19B show a construction of a coupling unit for a stabilizer and a lower control arm, as the sixth example. FIG. [18A] *19A* shows a partial front view of a wishbone-type suspension including the coupling unit for the stabilizer for a vehicle. FIG. [18B] *19B* shows an enlarged sectional view of the coupling unit shown in FIG. [18A] *19A*. A wheel 1501 is rotatably supported by a knuckle 1503. The knuckle 1503 is pivotally coupled at the upper end to one end of an upper control arm 1507 by a pivot 1505, and pivotally coupled at the other end to one end of the lower control arm 1511 by a pivot 1509. The upper control arm 1507 and the lower control arm 1511 are pivotally coupled to the cross member 1517 of the vehicle by pivots 1513 and 1515. The stabilizer 1518, which is shaped as U, is disposed along the width of the vehicle. The stabilizer 1518 is coupled at its central rod 1519 to the body 1524 of the vehicle by brackets 1522 with rubber bushes not shown in the drawings, so that the stabilizer can be turned about its axis. The tip 1520a of the arm 1520 of the stabilizer 1518 is coupled to a point near one end of the lower control arm 1511 by the coupling unit 1525. The coupling unit 1525 includes a piston-cylinder assembly 1526 composed of a piston 1529 and a cylinder 1530 which define two cylinder chambers 1527 and 1528. The cylinder 1530 includes an inner cylinder 1532 which supports the piston 1529 movably back and forth along an axis 1531, and outer cylinder 1533 disposed substantially concentrically to the inner cylinder 1532, and end caps 1534 and 1535 which close both the ends of the inner cylinder and the outer cylinder. The piston 1529 includes a main portion 1536, and a piston rod 1537, which bears the main portion 1536 at one end of the piston rod and extends along the axis 1131 through the end cap 1534 and the hole 1538 of the tip of the arm 1520 of the stabilizer 1518. A rubber bush 1540 and a retainer 1541 for holding the bush are interposed between the shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped. The inner cylinder 1532 is provided with through holes 1552 and 1553 near the end caps 1534 and 1535. The end cap 1534 in integrally provided with a projection 1554 extending along the axis 1531 between the inner cylinder 1532 and the outer cylinder 1533 and located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 and the other through hole 1553 constitute a passage means for connecting both the cylinder chambers 1527 and 1528 to each other. A portion of the annular space 1555 is filled with air. Portions of the cylinder chambers 1527 and 1528, the internal passage 1556 and the annular 1555 are filled with oil. The change in the volume of the piston rod 1537 in the cylinder 1530, which is caused by the displacement of the piston 1529 relative to the cylinder, is compensated by the compression or expansion of the air filled in the portion of the annular space 1555. The communication of the internal passage 1556 is selectively controlled by normally-opened solenoid valve 1557. The solenoid valve 1557 includes a housing 1559 containing a solenoid 1558 and secured at one end on the outer cylinder 1533, a core 1561 supported in the housing 1559 movably back and forth along an axis 1560, and a compressed helical spring 1562 for urging the core 1561 rightward as to FIG. 19B. A valve element 1563 is integrally provided at one end of the core 1561 so that the valve element is selectively fitted into a hole 1564 extending in the projection 1554 across the internal passage 1556. When no electricity is applied to the solenoid 1558 according to an instruction from an ECU 4, the core 1561 is urged rightward as to the drawing, by the compressed helical spring 1562, to open the valve 1557 to allow the communication of the internal passage 1556. When electricity is applied to the solenoid 1558 according to an instruction from the ECU 4, the core 1561 is driven leftward as to the drawings, against the force of the compressed helical spring 1562, to fit the valve element 1563 into the hole 1564 to shut the internal passage 1556. At that time, the cylinder chambers 1527 and 1528 are disconnected from each other, and the oil in the cylinder chambers is kept from flowing to the opposite cylinder chambers, so that the piston 1529 is hindered from moving relative to the cylinder 1530 along the axis 1531. As a result, the stabilizer 1518 is put in such a state that it can fulfill its function to suppress the rolling of the vehicle to improve the controllability and the stability of the vehicle as its wheel on one side moves up on a protrusion of a road surface for the vehicle and down into a hollow of a road surface. When no electricity is applied to the solenoid 1558, the solenoid valve 1557 is maintained in an open position shown in FIG. 19B, so that the oil in both the cylinder chambers 1527 and 1528 can freely flow to the opposite cylinder chambers through the internal passage 1556 and so forth. As a result, the piston 1529 can freely move relative to the cylinder 1530 so that the tips of both the right and left arms 1520 can freely move relative to the corresponding lower control arms 1511. For that reason, the stabilizer does not fulfill its function, so that the shock at each rear wheel of the vehicle is reduced to keep the feel of ride of the vehicle good.

What is claimed is:

1. A rear wheel suspension controller for a vehicle having a suspension between a body and a wheel of the vehicle comprising:

*a rear wheel suspension control portion including:*

[a] front wheel vehicle height detection means for detecting an interval between a front wheel and a vehicle body and for generating a vehicle height signal indicative of the interval;

[a] first judgment means for comparing said vehicle height signal with a predetermined reference signal and for generating a first judgment signal when the vehicle height signal is greater than the reference signal; *and*

[a] rear wheel suspension characteristic alteration means for altering *a* suspension characteristic of a rear wheel in accordance with said first judgment signal;

*a vehicle posture control portion including:*

[a] driving state detection means for detecting a driving state of the vehicle and for generating *at least* one [or plural] state [signals] *signal* indicative of the driving state;

[a] second judgment means for comparing said *at least one* state [signals] *signal* with respectively corresponding predetermined [condition] *conditions* and for generating *a* second judgment signal when said *at least one* state [signals satisfy] *signal satisfies* the *respective* predetermined conditions;

[a] suspension characteristic alteration means for controlling the suspension characteristic in accordance with said second judgment signal; and

[a] preference means for preferring the control of [a] *said* vehicle posture control portion [which is consisted of the front wheel vehicle height detection means, the first judgment means and the rear wheel suspension characteristic alteration means] to that of [a] *said* rear wheel suspension control portion [which is consisted of the driving state detection means, the second judgment means and the suspension characteristic alteration means].

2. A rear wheel suspension controller according to claim 1, wherein the rear wheel suspension characteristic is returned to the original state after a time interval determined from the vehicle speed elapses since the rear suspension characteristic alteration means has altered the rear suspension characteristic according to the first judgment signal.

3. A rear wheel suspension controller according to claim 2, wherein the front wheel vehicle height detection means detects intervals between the left front wheel and the vehicle body and the right front wheel and the vehicle body respectively and averages the two intervals to generate the vehicle height signal.

4. A rear wheel suspension controller according to claim 2, wherein the front wheel vehicle height detection means detects intervals between the left front wheel and the vehicle body and the right front wheel and the vehicle body respectively and takes the greater one of the two intervals to generate the vehicle height signal.

5. A rear wheel suspension controller according to claim 2, wherein the front wheel vehicle height detection means detects intervals between the left front wheel and the vehicle body and the right front wheel and the vehicle body respectively to generate a right height signal and a left height signal correspondingly to the respective intervals and the first judgment means comprises the larger one of the right height signal and the left height signal with a reference signal to generate the first judgment signal when the larger one is greater than the reference signal.

6. A rear wheel suspension controller according to claim 2, wherein the first judgment means compares the height signal with a plurality of preset reference signals to generate [one] *one* of a plurality of the first judgment signals according to the size of the height signal, the rear suspension characteristic means alters the rear suspension characteristic into a plurality of stages in accordance with each of the plurality of the first judgment signals.

7. A rear wheel suspension controller according to claim 2, wherein the first judgment means has a determination means for determining whether or not the first judgment means generates the first judgment signal.

* * * * *